(12) United States Patent
Ito

(10) Patent No.: US 10,631,345 B2
(45) Date of Patent: *Apr. 21, 2020

(54) COMMUNICATION CONTROL DEVICE, COMMUNICATION CONTROL METHOD, PROGRAM, AND COMMUNICATION CONTROL SYSTEM

(71) Applicant: SONY CORPORATION, Tokyo (JP)

(72) Inventor: Tomoyuki Ito, Kanagawa (JP)

(73) Assignee: SONY CORPORATION, Tokyo (JP)

(*) Notice: Subject to any disclaimer, the term of this patent is extended or adjusted under 35 U.S.C. 154(b) by 11 days.

This patent is subject to a terminal disclaimer.

(21) Appl. No.: 15/695,591

(22) Filed: Sep. 5, 2017

(65) Prior Publication Data

US 2017/0367128 A1   Dec. 21, 2017

Related U.S. Application Data

(63) Continuation of application No. 14/798,777, filed on Jul. 14, 2015, now Pat. No. 9,781,749, which is a
(Continued)

(30) Foreign Application Priority Data

Jun. 29, 2012   (JP) .................................. 2012-146682

(51) Int. Cl.
*H04W 76/10*   (2018.01)
*H04W 8/00*    (2009.01)
*H04W 84/18*   (2009.01)

(52) U.S. Cl.
CPC .......... *H04W 76/10* (2018.02); *H04W 8/005* (2013.01); *H04W 84/18* (2013.01)

(58) Field of Classification Search
CPC ..... H04W 8/005; H04W 84/18; H04W 84/12; H04W 12/02; H04W 4/50; H04W 74/00;
(Continued)

(56) References Cited

U.S. PATENT DOCUMENTS

2007/0097934 A1   5/2007   Walker et al.
2009/0036111 A1   2/2009   Danford et al.
(Continued)

FOREIGN PATENT DOCUMENTS

| JP | 2002-132446 | 5/2002 |
| JP | 2010-176710 | 8/2010 |
| JP | 2011-044040 | 3/2011 |

OTHER PUBLICATIONS

Nov. 17, 2015, JP communication issued for related JP application No. 2012-146682.
(Continued)

*Primary Examiner* — Golam Sorowar
(74) *Attorney, Agent, or Firm* — Paratus Law Group, PLLC

(57) ABSTRACT

Provided is a communication control device for controlling wireless communication among a plurality of communication apparatuses, including an identification information acquisition unit configured to acquire, from a first object corresponding to a first communication apparatus of the plurality of communication apparatuses, first identification information for identifying the first communication apparatus, and to acquire, from a second object corresponding to a second communication apparatus of the plurality of communication apparatuses, second identification information for identifying the second communication apparatus, an action recognition unit configured to recognize an action of coupling the first object with the second object, and a connection control unit configured to perform communication between the first communication apparatus and the second communication apparatus corresponding to the coupled first object and second object, respectively, based on the acquired first identification information and second identification information to connect the first communica-
(Continued)

tion apparatus to the second communication apparatus through wireless communication.

20 Claims, 20 Drawing Sheets

Related U.S. Application Data continuation of application No. 13/905,615, filed on May 30, 2013, now Pat. No. 9,113,444.

(58) Field of Classification Search
CPC ..... H04W 88/04; H04W 12/06; H04W 12/08; H04W 12/12; H04W 40/24; H04W 48/20; H04W 4/00; H04W 4/003; H04W 4/60; H04W 72/00; H04W 72/10; H04W 72/1205; H04W 76/10; H04W 76/14; H04L 67/16; H04L 12/2807; H04L 12/2809; H04L 12/282; H04L 2012/2849; H04L 2209/80; H04L 2463/061; H04L 2463/062; H04L 41/0893; H04L 63/0209; H04L 63/0272; H04L 63/04; H04L 63/0428; H04L 63/062; H04L 63/08; H04L 67/04; H04L 67/10; H04L 67/303; H04L 67/306; H04L 67/36

See application file for complete search history.

(56) References Cited

U.S. PATENT DOCUMENTS

| | | | |
|---|---|---|---|
| 2010/0304674 A1* | 12/2010 | Kim | H04W 76/10 455/41.2 |
| 2012/0039202 A1 | 2/2012 | Song | |
| 2012/0144347 A1* | 6/2012 | Jo | G06F 3/04883 715/863 |
| 2012/0159340 A1* | 6/2012 | Bae | G06F 1/1626 715/738 |
| 2012/0233688 A1 | 9/2012 | Tonouchi et al. | |
| 2012/0250576 A1 | 10/2012 | Rajamani et al. | |
| 2012/0287034 A1* | 11/2012 | Park | H04L 12/2807 345/156 |

OTHER PUBLICATIONS

Apr. 5, 2017, CN communication issued for related CN application No. 201310271125.3.

* cited by examiner

COMMUNICATION CONTROL DEVICE, COMMUNICATION CONTROL METHOD, PROGRAM, AND COMMUNICATION CONTROL SYSTEM

CROSS REFERENCE TO PRIOR APPLICATION

This application is a continuation of U.S. patent application Ser. No. 14/798,777 (filed on Jul. 14, 2015), which is a continuation of U.S. patent application Ser. No. 13/905,615 (filed on May 30, 2013 and issued as U.S. Pat. No. 9,113,444 on Aug. 18, 2015), which claims priority to Japanese Patent Application No. 2012-146682 (filed on Jun. 29, 2012), which are all hereby incorporated by reference in their entirety.

BACKGROUND

The present disclosure relates to a communication control device, a communication control method, a program, and a communication control system.

In recent years, a plurality of communication apparatuses have wirelessly communicated with each other. Wireless communication includes various types of wireless standards such as Bluetooth (registered trademark) and Wi-Fi (registered trademark). Communication apparatuses perform wireless communication based on desired wireless standards in accordance with users' selection.

SUMMARY

Incidentally, when a communication apparatus supports a plurality of wireless standards, a user of the communication apparatus has to set the wireless standards. Consequently, a connection among communication apparatuses through wireless communication is all the more complicated for the user. Different from wired communication, it is very difficult for a user to distinguish connected communication apparatuses from each other when a connection is established through wireless communication. The user therefore has to confirm a connection state of each communication apparatus in order to distinguish the connected communication apparatuses from each other.

JP 2002-132446A discloses a technology for providing a simpler interface by using a real object. However, JP 2002-132446A focuses on only associating a function of an application with a real object, and intuitively operating the application that uses the shape of a real object. As a result, it is still difficult to complete a connection without individually confirming connection states of apparatuses through wireless communication.

Thus, the present disclosure proposes a method of easily connecting communication apparatuses through wireless communication, and easily grasping the connection states.

According to an embodiment of the present disclosure, there is provided a communication control device for controlling wireless communication among a plurality of communication apparatuses, the communication control device including an identification information acquisition unit configured to acquire, from a first object corresponding to a first communication apparatus of the plurality of communication apparatuses, first identification information for identifying the first communication apparatus, and to acquire, from a second object corresponding to a second communication apparatus of the plurality of communication apparatuses, second identification information for identifying the second communication apparatus, an action recognition unit configured to recognize an action of coupling the first object with the second object, and a connection control unit configured to perform communication between the first communication apparatus and the second communication apparatus corresponding to the coupled first object and second object, respectively, based on the acquired first identification information and second identification information to connect the first communication apparatus to the second communication apparatus through wireless communication.

According to another embodiment of the present disclosure, there is provided a communication control method including acquiring, from a first object corresponding to a first communication apparatus of a plurality of communication apparatuses capable of wirelessly communicating with each other, first identification information for identifying the first communication apparatus, and acquiring, from a second object corresponding to a second communication apparatus, second identification information for identifying the second communication apparatus, recognizing an action of coupling the first object with the second object, and performing communication between the first communication apparatus and the second communication apparatus corresponding to the coupled first object and second object, respectively, based on the acquired first identification information and second identification information to connect the first communication apparatus to the second communication apparatus through wireless communication.

According to another embodiment of the present disclosure, there is provided a program for causing a computer to execute acquiring, from a first object corresponding to a first communication apparatus of a plurality of communication apparatuses capable of wirelessly communicating with each other, first identification information for identifying the first communication apparatus, and acquiring, from a second object corresponding to a second communication apparatus, second identification information for identifying the second communication apparatus, recognizing an action of coupling the first object with the second object, and performing communication between the first communication apparatus and the second communication apparatus corresponding to the coupled first object and second object, respectively, based on the acquired first identification information and second identification information to connect the first communication apparatus to the second communication apparatus through wireless communication.

According to another embodiment of the present disclosure, there is provided a communication control system including a plurality of communication apparatuses capable of wirelessly communicating with each other, a plurality of objects corresponding to the plurality of communication apparatuses, respectively, the plurality of objects each including identification information for a corresponding communication apparatus, and a communication control device configured to control a connection through wireless communication among the plurality of communication apparatuses. The communication control device includes an identification information acquisition unit configured to acquire, from a first object corresponding to a first communication apparatus of the plurality of communication apparatuses, first identification information for identifying the first communication apparatus, and to acquire, from a second object corresponding to the second communication apparatus of the plurality of communication apparatuses, second identification information for identifying the second communication apparatus, an action recognition unit configured to recognize an action of coupling the first object with the second object, and a connection control unit configured to perform communication between the first communication apparatus and the second communication apparatus corresponding to the coupled first object and second object, respectively, based on the acquired first identification information and second identification information to connect the first communication apparatus to the second communication apparatus through wireless communication.

According to the embodiments of the present disclosure described above, it is possible to easily connect communication apparatuses through wireless communication, and to easily grasp the connection states.

DETAILED DESCRIPTION OF THE EMBODIMENT(S)

Figure 1:
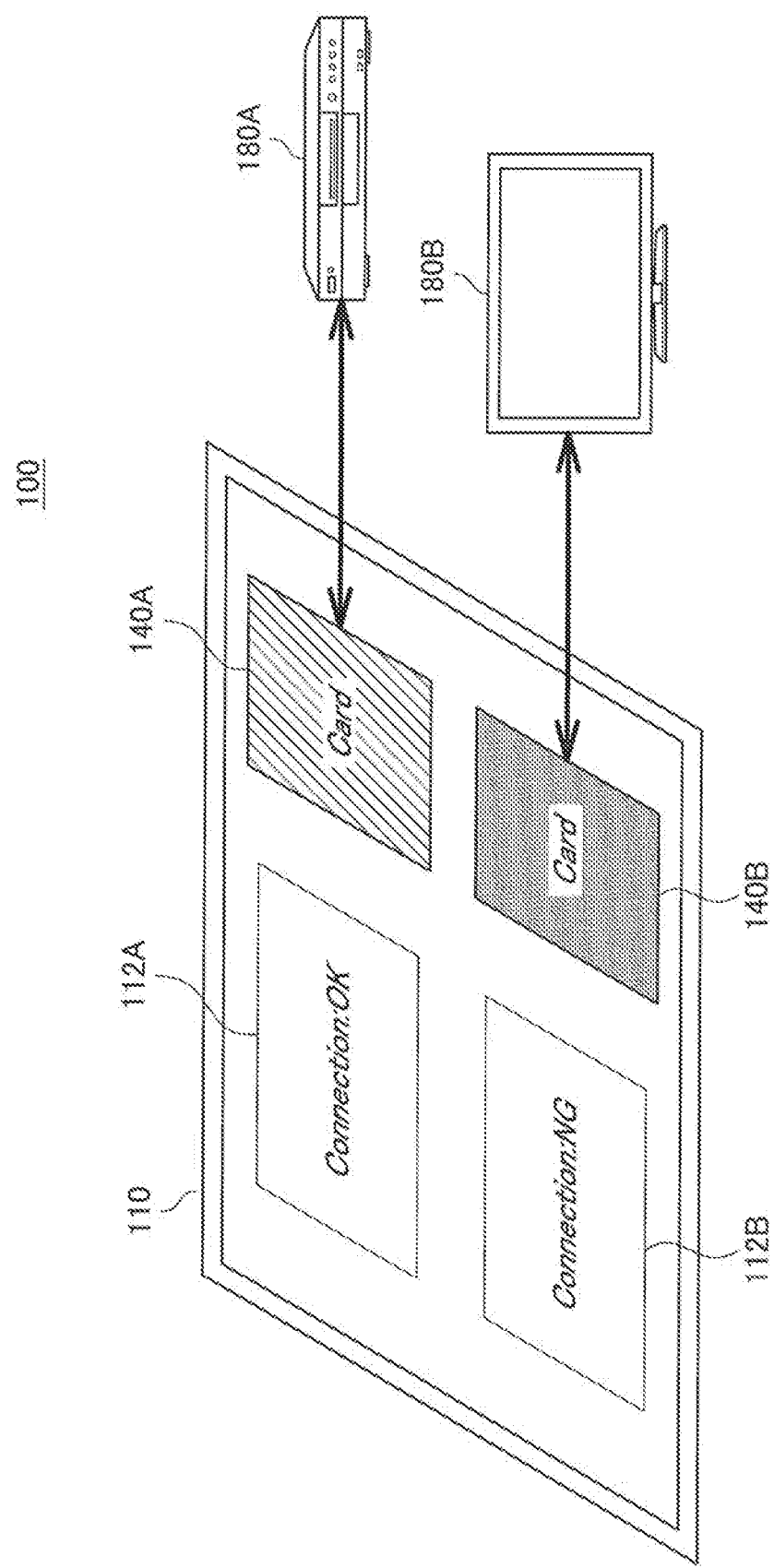
FIG. 1 is a diagram illustrating an example of a configuration of a communication control system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. First Embodiment
1-1. Overview of Communication Control System
1-2. Example of Functional Configuration of Communication Control Device
1-3. Example of Connection Process of Wireless Communication
2. Second Embodiment
2-1. Overview of Communication Control System
2-2. Example of Functional Configuration of Communication Control Device
2-3. Example of Connection Process of Wireless Communication
3. Other Embodiments
4. Conclusion 1. First Embodiment (1-1. Overview of Communication Control System)

An overview of a communication control system 100 according to a first embodiment of the present disclosure will be described with reference to FIG. 1.

FIG. 1 is a diagram illustrating an example of a configuration of the communication control system 100 according to the first embodiment of the present disclosure. As illustrated in FIG. 1, the communication control system 100 includes a display device 110, cards 140A and 140B (which may be generically referred to as card 140, hereinafter), and communication apparatuses 180A and 180B (which may be generically referred to as communication apparatus 180). Although FIG. 1 has the two cards 140A and 140B, and the two communication apparatuses 180A and 180B, FIG. 1 may have three or more cards 140 and communication apparatuses 180.

The card 140A corresponds to the communication apparatus 180A, and the card 140B corresponds to the communication apparatus 180B. The card 140A can record, for example, through NFC or the like, identification information for identifying the communication apparatus 180A, and communication information for performing one-to-one communication with the card 180A. Additionally, when the card 140A is an accessory for the communication apparatus 180A, the identification information for identifying the communication apparatus 180A and the like are stored in advance.

Similarly to the card 140A, the card 140B can also record identification information for identifying the communication apparatus 180B, and communication information for performing one-to-one communication with the communication apparatus 180B. Additionally, when the card 140B is an accessory for the communication apparatus 180B, the identification information for identifying the communication apparatus 180B and the like are stored in advance.

The communication apparatus 180 allows a user to use various services (functions) such as video distribution and video reception. The communication apparatus 180 performs wireless communication based on a wireless standard such as Bluetooth or Wi-Fi. The communication apparatus 180 according to the first embodiment wirelessly communicates with the display device 110 and another communication apparatus. In FIG. 1, the communication apparatuses 180A and 180B wirelessly communicate with each other, and wirelessly communicate with the display device 110.

The display device 110 is, for example, a sheet type display, and displays various types of information. The display device 110 can also communicate with the card 140 disposed on the display device 110 through near field wireless communication such as NFC. The display device 110 receives, from the card 140, the identification information for identifying the communication apparatus 180 to which the card 140 corresponds, the communication information for communicating with the communication apparatus 180, or the like.

(Connection between Display Device 110 and Communication Apparatus 180)

The display device 110 can wirelessly communicate with the communication apparatus 180. In the present embodiment, the display device 110 attempts a one-to-one connection to the communication apparatus 180 corresponding to the card 140 disposed on the display device 110, based on the identification information, the communication information, and the like received from the card 140. In FIG. 1, the display device 110 attempts a connection to the communication apparatus 180A based on the information received from the card 140A, and attempts a connection to the communication apparatus 180B based on the information received from the card 140B.

The display device 110 displays a connection state of the communication apparatus 180 to which the display device 110 has attempted to connect. Here, let us assume that the connection between the display device 110 and the communication apparatus 180A has been completed, while the connection between the display device 110 and the communication apparatus 180B has failed to be established. In this case, the display device 110 displays, as illustrated in FIG. 1, in a display area 112A next to the card 140A that the connection to the communication apparatus 180A has been completed, and displays in a display area 112B next to the card 140B that the connection to the communication apparatus 180B fails. In this way, since a user or the like is informed of a state of the connection between the display device 110 and the communication apparatus 180 in a visual manner, the user or the like can easily determine the state of the connection between the display device 110 and the communication apparatus 180.

(Notification of Wireless Standard That Communication Apparatuses Support)

The display device 110 acquires, from the communication apparatus 180 having completed a connection, information regarding a wireless standard (such as Bluetooth or Wi-Fi) that the communication apparatus 180 supports. Then, the display device 110 issues a notification of the acquired information regarding the wireless standard.

Figure 2:
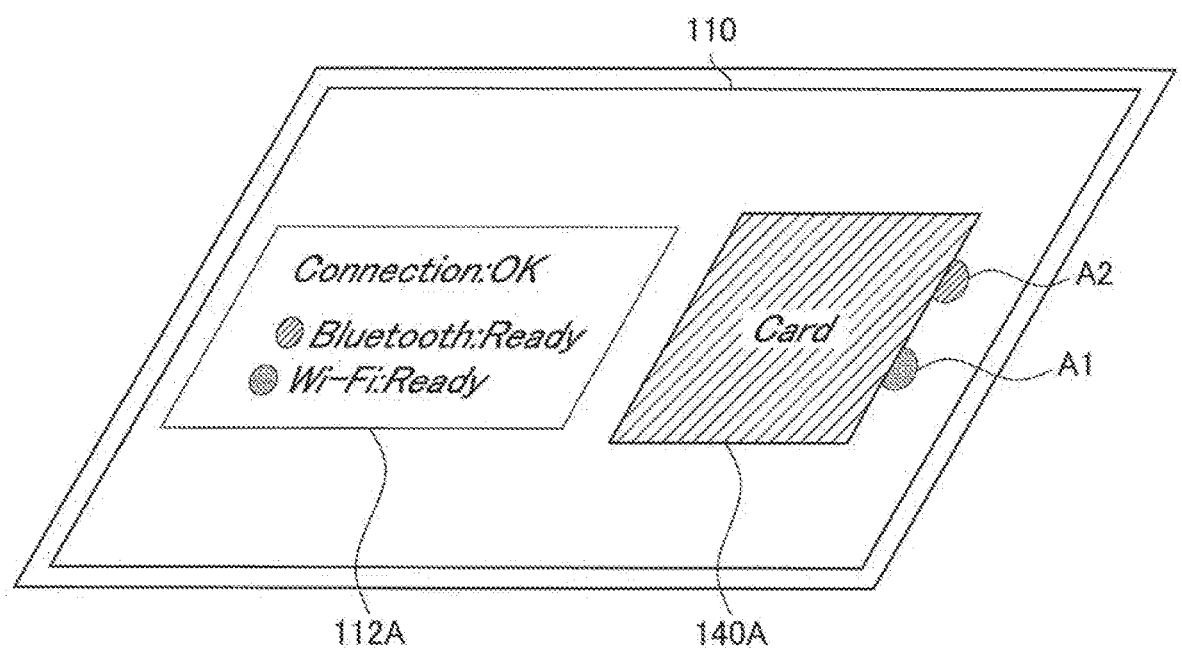
FIG. 2 is a diagram illustrating an example of a notification of wireless standards that communication apparatuses having completed a connection support.

FIG. 2 is a diagram illustrating an example of a notification of wireless standards that the communication apparatus 180 having completed a connection supports. Here, let us assume that a connection has been completed between the display device 110 and the communication apparatus 180A corresponding to the card 140A illustrated in FIG. 1. Then, the display device 110 displays pointers A1 and A2 to which wireless standards that the communication apparatus 180A supports are assigned in an area corresponding to an end of the card 140A. Here, let us assume that Bluetooth is assigned to the pointer A1, and Wi-Fi is assigned to the pointer A2. The display device 110 displays the pointers A1 and A2 by turning on lights or blinking lights in different colors, for example, such that the pointers A1 and A2 are easy to be distinguished.

As illustrated in FIG. 2, the display device 110 also displays the information regarding the wireless standards assigned to the pointers A1 and A2 in a display area 112A on a side of the card 140A. Here, the display device 110 displays types of wireless standards that the communication apparatus 180A supports, and displays whether a connection through each wireless standard has been ready to be established. Consequently, a user or the like can visually grasp whether the connection of the communication apparatus 180A is ready.

(Connection of Communication Apparatuses by Card)

After the display device 110 completes the communication with the communication apparatuses 180 corresponding to the plurality of cards 140, a user joins the pointers of the two cards 140 so that a connection is established between the two communication apparatuses 180 corresponding to the cards 140, based on a wireless standard assigned to the pointers. The user can hereby visually connect the communication apparatuses 180 based on a desired wireless standard even if no complicated setting or the like is applied in the communication apparatuses 180. The user does not also have to take time out to apply any connection setting or the like in each of the communication apparatuses 180.

The display device 110 displays whether the connection succeeds or fails between the two communication apparatuses 180 based on the wireless standard assigned to the pointers. A user can thereby visually grasp a connection state based on a desired wireless standard. As a result, the user does not have to take time out to confirm the connection state of each of the communication apparatuses 180.

Figure 3:
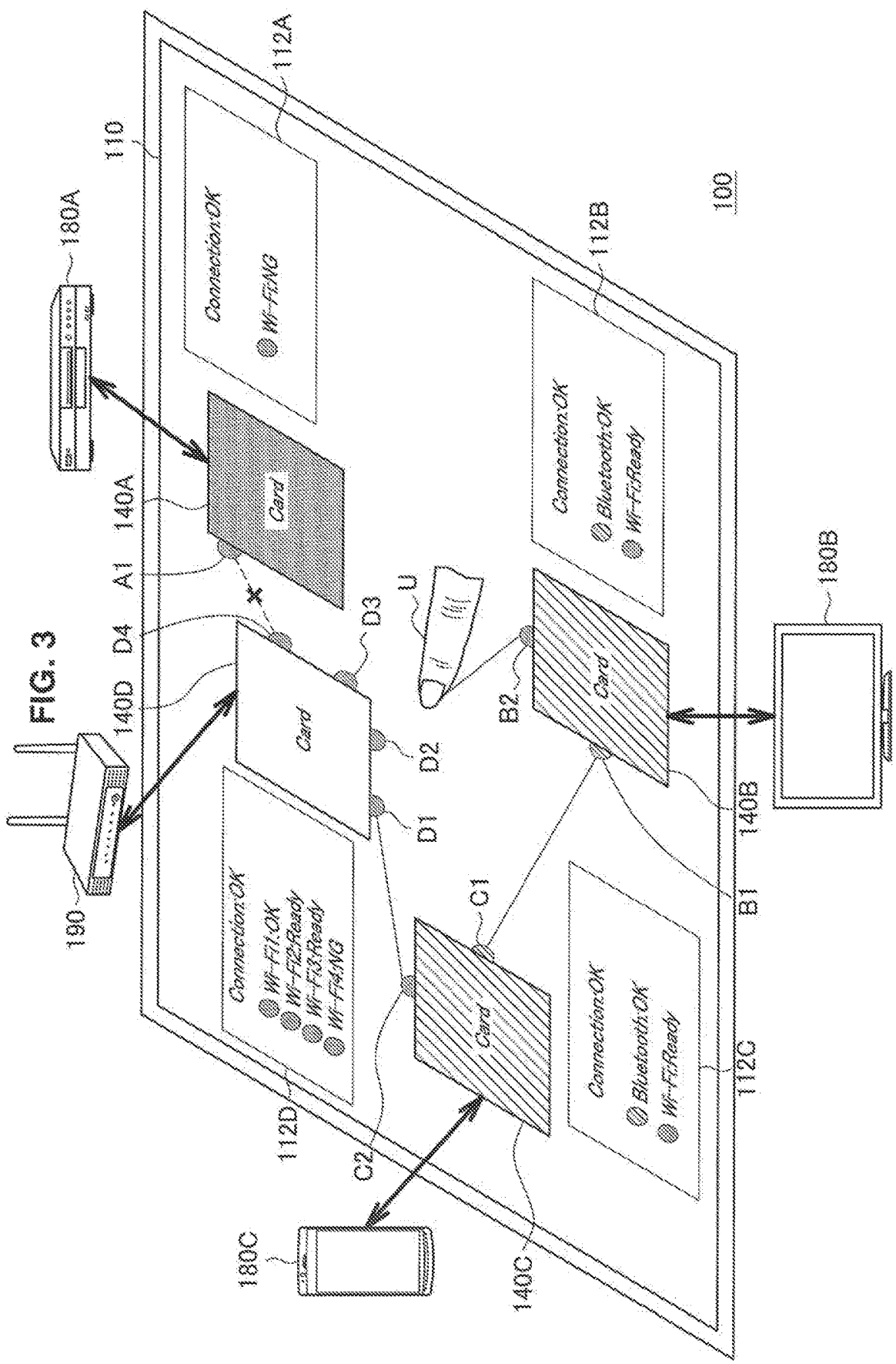
FIG. 3 is a diagram illustrating a state in which a plurality of cards are joined on a display device.

FIG. 3 is a diagram illustrating a state in which the plurality of cards 140 are joined on the display device 110. Let us assume in FIG. 3 that the display device 110 has completed connections to the communication apparatus 180A corresponding to the card 140A, the communication apparatus 180B corresponding to the card 140B, the communication apparatus 180C corresponding to the card 140C, and a rooter 190 corresponding to the card 140D. Once a user moves his/her finger on the pointer of the card 140, a line is displayed on the display device 110 so as to extend from the pointer. For example, in FIG. 3, the user touches onto the pointer B2 of the card 140B to move the line toward the pointer D2 of the card 140D. A line extending from the pointer B2, which is a start point, to the pointer D2 is also shown.

In FIG. 3, a user joins the pointer B1 of the card 140B to the pointer C1 of the card 140C to connect the communication apparatus 180B corresponding to the card 140B and the communication apparatus 180C corresponding the card 140C based on Bluetooth. Display windows 112A and 112B display that the connection of the communication apparatuses 180B and 180C has been completed based on Bluetooth. Similarly, the user joins the pointer C2 of the card 140C to a pointer D1 of the card 140D, and as illustrated in the display windows 112C and 112D, the connection of the communication apparatus 180C and the rooter 190 has been completed based on Wi-Fi. To the contrary, although the user joins the pointer A1 of the card 140A to the pointer D4 of the card 140D, as illustrated in the display windows 112A and 112D, the connection of the communication apparatus 180A and the rooter 190 based on Wi-Fi fails.
(Notification of Service Compatible with Communication Apparatus)

After the communication apparatuses 180 are connected to each other, the display device 110 acquires, from each of the communication apparatuses 180, service information regarding a service available to the communication apparatuses 180. The display device 110 issues a notification of the acquired service information. Specifically, the display device 110 displays the service information in a display window positioned on a side of each of the cards 140. A user can thereby visually grasp a service available to each of the communication apparatuses 180 so that the user does not have to take time out to confirm the service in each of the communication apparatuses 180.

For example, as a service, a service for file sharing in which a file such as a still image is shared among the communication apparatuses 180 will be mentioned. The service for file sharing is available, for example, when a protocol of FTP is supported between the communication apparatuses 180 between which a one-to-one connection is established based on Bluetooth. As another service, a service for video distribution or video reception can be mentioned. The service for video distribution or video reception is available when the communication apparatuses 180 are compatible with a DLNA server or a DLNA client.

Figure 4:
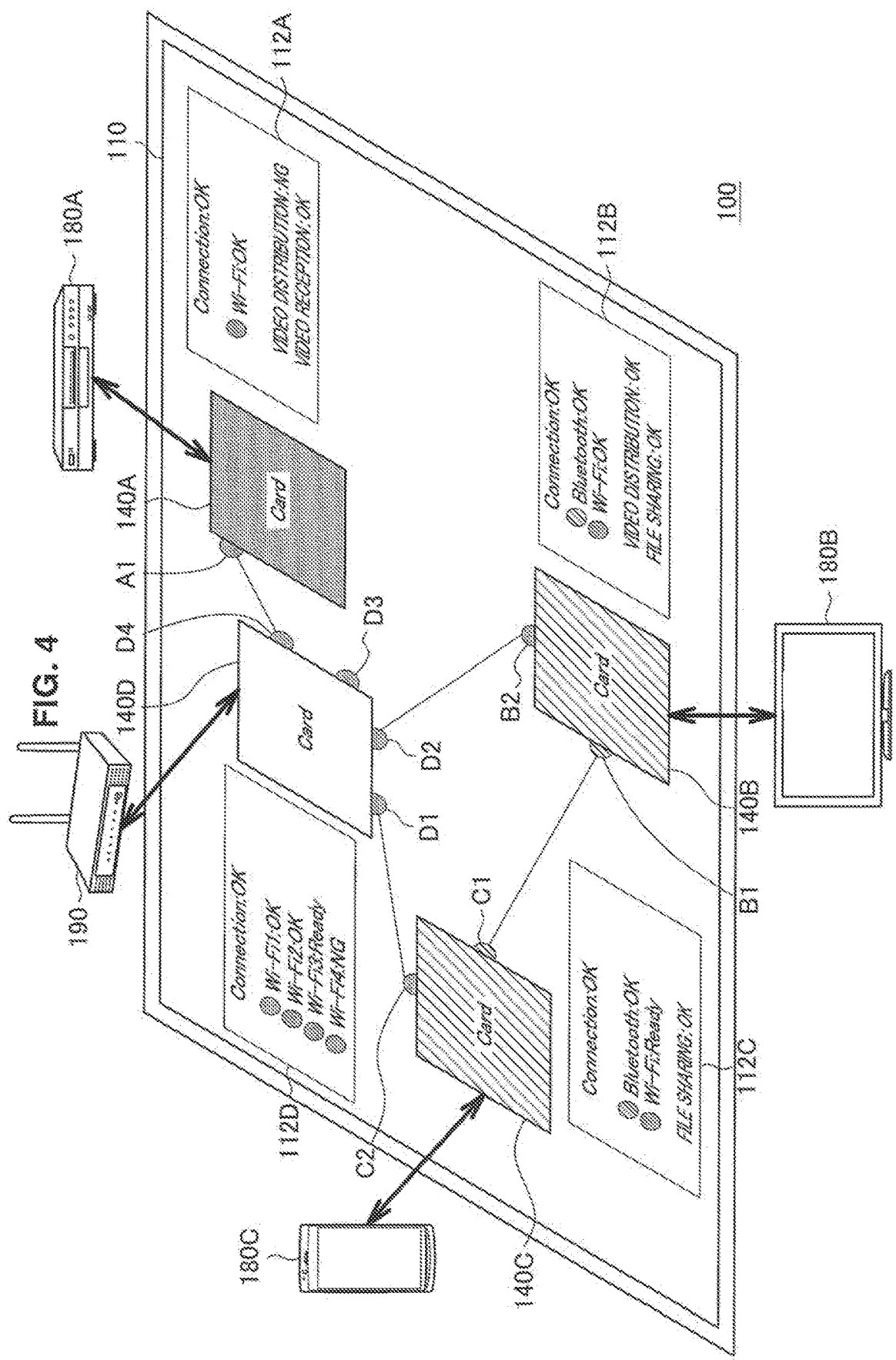
FIG. 4 is a diagram illustrating an example of a notification regarding services available to each communication apparatus.

FIG. 4 is a diagram illustrating an example of a notification regarding services available to each of the communication apparatuses 180. In FIG. 4, as illustrated in the display window 112A, while the communication apparatus 180A is not capable of using the service for video distribution, the service for video reception is available. Meanwhile, as illustrated in the display window 112B, the communication apparatus 180B can use the service for video distribution and the service for file sharing including a still image. As illustrated in the display window 112C, the communication apparatus 180C can use the service for file sharing. When impairment occurs in the service, it is displayed that the service is not available.

(1-2. Example of Functional Configuration of Communication Control Device)

As described above, the display device 110 controls wireless communication among the communication apparatuses 180 corresponding to the cards 140, based on the cards 140 disposed on the display device 110. The display device 110 includes a communication control device 150 for controlling wireless communication among the plurality of communication apparatuses 180. An example of a functional configuration of the communication control device 150 according to the first embodiment will be described below with reference to FIG. 5.

Figure 5:
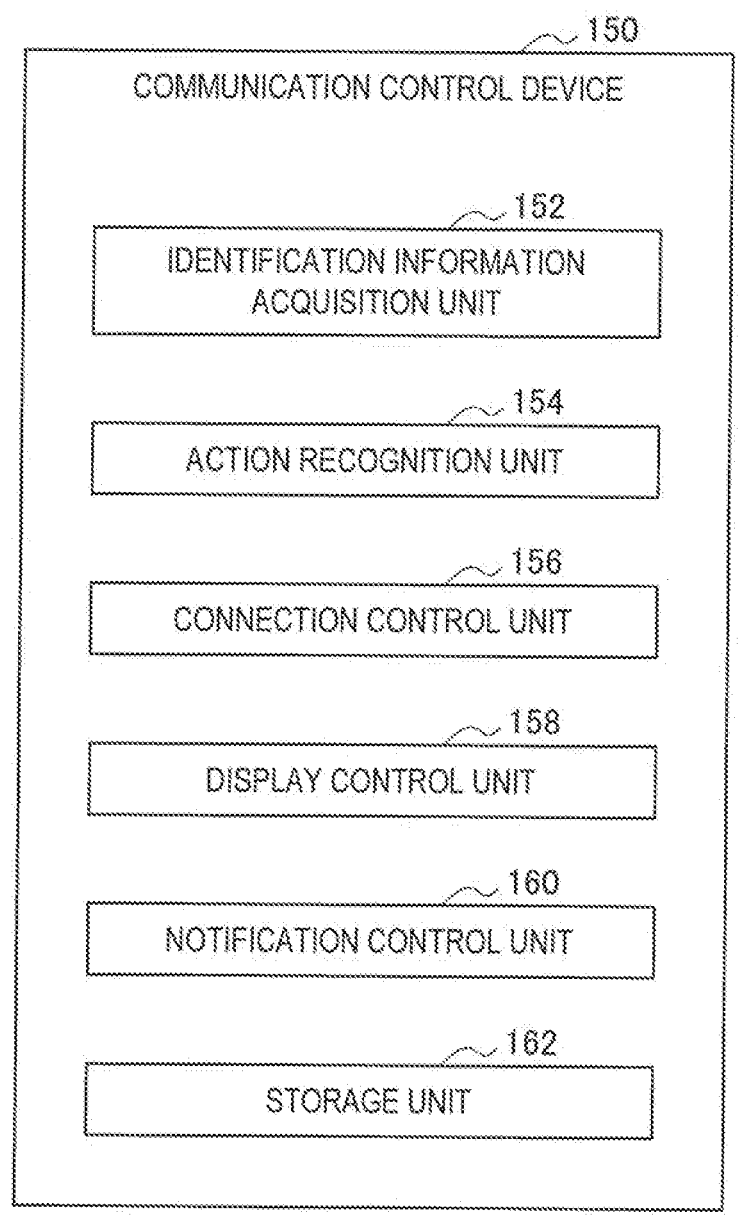
FIG. 5 is a block diagram illustrating an example of a functional configuration of a communication control device according to the first embodiment.

FIG. 5 is a block diagram illustrating an example of a functional configuration of the communication control device 150 according to the first embodiment. As illustrated in FIG. 5, the communication control device 150 includes an identification information acquisition unit 152, an action recognition unit 154, a connection control unit 156, a display control unit 158, a notification control unit 160, and a storage unit 162.

The identification information acquisition unit 152 acquires, from the card 140 (first object) corresponding to a first communication apparatus 180 of the plurality of communication apparatuses 180, identification information (first identification information) for identifying the first communication apparatus. The identification information acquisition unit 152 also acquires, from the card 140 (second object) corresponding to a second communication apparatus 180, identification information (second identification information) for identifying the second communication apparatus 180. For example, the identification information acquisition unit 152 acquires identification information by receiving the identification information stored in the card 140 through NFC or the like. As an example, let us assume for the following description that the first communication apparatus is the communication apparatus 180A, the second communication apparatus is the communication apparatus 180B, the first object, which is a card-shaped object, is the card 140A, and the second object is the card 140B.

The action recognition unit 154 recognizes an action of coupling the card 140A with the card 140B by a user. In the first embodiment, as illustrated in FIG. 1 or the like, the card 140A and the card 140B are disposed on the display device 110, which can receive a touch operation. In the first embodiment, an action of coupling the card 140A with the card 140B indicates, as illustrated in FIG. 3, an action of joining the card 140A to the card 140B on the display device 110 through a user's touch operation. Consequently, the user can intuitively understand that the card 140A and the card 140B are coupled.

The connection control unit 156 communicates with the communication apparatus 180A and the communication apparatus 180B corresponding to the coupled card 140A and card 140B, respectively, based on the acquired identification information regarding the two communication apparatuses 180A and 180B, and connects the communication apparatus 180A to the communication apparatus 180B with each other through wireless communication. Consequently, only coupling the visible two cards allows a user to establish a connection between desired communication apparatuses 180 through wireless communication.

The display control unit 158 displays, on a display screen (corresponding to the display unit) of the display device 110, information regarding wireless standards that the respective communication apparatuses 180A and 180B support. For example, as illustrated in FIG. 3, the display control unit 158 displays, on the display screen, types of wireless standards that the communication apparatuses 180A and 180B support. The user can hereby easily grasp the wireless standards that the communication apparatus 180A and the communication apparatus 180B support.

The display control unit 158 causes pointers (such as the pointers A1 and B1 illustrated in FIG. 3) supporting a plurality of wireless standards to be displayed in association with the card 140A and the card 140B. When an action of joining, by a touch operation, the pointers associated with the respective cards 140A and 140B is recognized by the action recognition unit 154, the connection control unit 156 connects the communication apparatus 180A to the communication apparatus 180B based on the wireless standards that the pointers support. Consequently, when attempting communication based on desired wireless standards, a user only has to join pointers supporting to the desired wireless standards so that convenience for a user is enhanced.

As illustrated in FIG. 3, the notification control unit 160 issues a notification regarding whether a connection through wireless communication has been completed between the communication apparatus 180A and the communication apparatus 180B, by using the display screen of the display device 110. As illustrated in FIG. 4, the notification control unit 160 issues a notification of information regarding services available to the communication apparatus 180A and the communication apparatus 180B through the display screen of the display device 110. The notification control unit 160 may also use a light emitting unit such as an LED instead of a display screen to issue a notification.

The storage unit 162 stores data that is used when the communication control device 150 performs a process. The storage unit 162 also stores a program that is executed when the communication control device 150 controls wireless communication.

(1-3. Example of Connection Process of Wireless Communication)

Next, an example of a connection process of wireless communication according to the first embodiment, which has the above-described configuration, will be described. The above-described communication control device 150 of the display device 110 executes the program stored in the storage unit 162 so that an example of a process described below is realized. The program to be executed may also be stored in a recording medium such as a Compact Disk (CD), a Digital Versatile Disk (DVD), and a memory card, or may also be downloaded from a server or the like via the Internet.

(Connection Process between Display Device and Communication Apparatus)

First, a connection process between the display device 110 and the communication apparatus 180 corresponding to the card 140 disposed on the display device 110 will be described with reference to FIG. 6.

Figure 6:
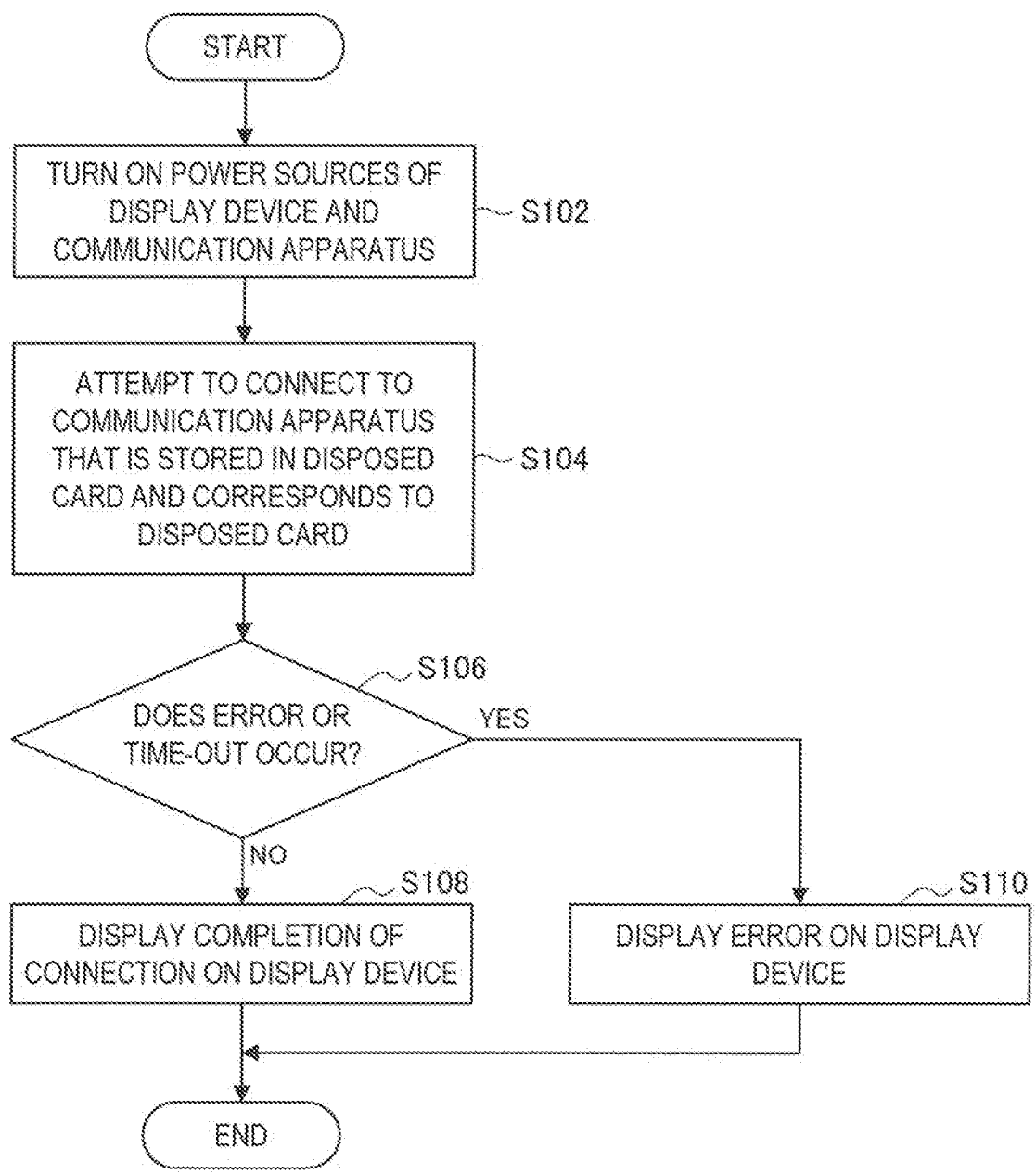
FIG. 6 is a flowchart illustrating a connection process between the display device and the communication apparatus.

FIG. 6 is a flowchart illustrating the connection process between the display device 110 and the communication apparatus 180. The flowchart illustrated in FIG. 6 starts when a user turns on the power sources of the display device 110 and the communication apparatus 180 (step S102). Let us assume that the card 140 is disposed on the display device 110, as illustrated in FIG. 1, and the display device 110 acquires, from the card 140, identification information or the like of the corresponding communication apparatus 180. Next, the display device 110 attempts to connect to the communication apparatus 180 corresponding to the card 140 disposed on the display device 110, based on the identification information or the like acquired from the card 140 (step S104).

Next, the display device 110 determines whether an error or time-out occurs while connecting to the communication apparatus 180 (S106). When an error or time-out does not occur in step S106 (No), the display device 110 displays, on the display window, a notification that the connection has been completed as illustrated in FIG. 1 (step S108). To the contrary, when an error or time-out occurs in step S106 (Yes), the display device 110 displays an error on the display window (step S110).

(Display Process of Wireless Standard That Communication Apparatus Having Completed Connection Supports)

Next, a display process of a wireless standard that the communication apparatus 180 having completed the connection to the display device 110 supports will be described with reference to FIG. 7.

Figure 7:
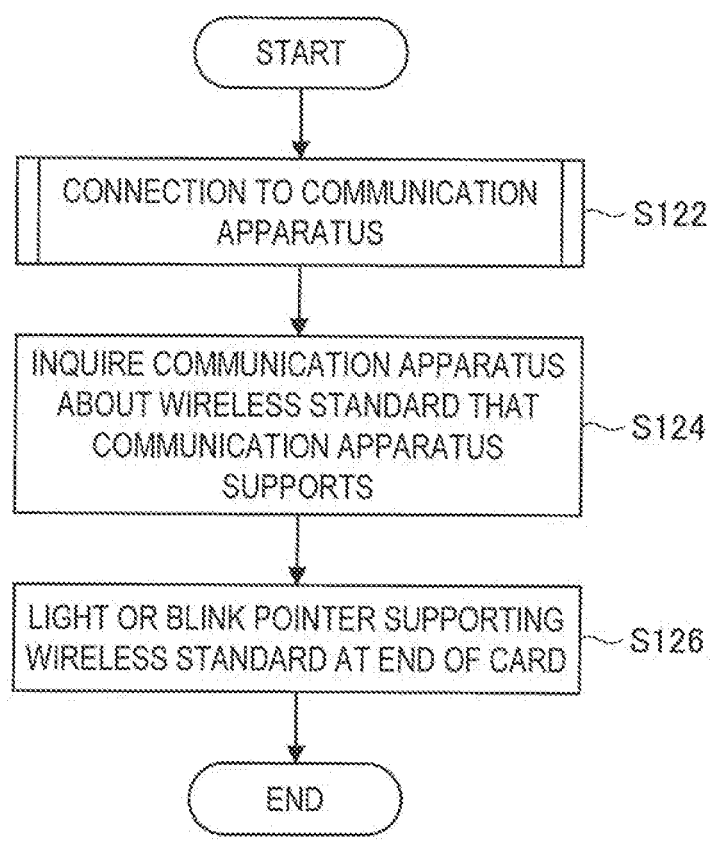
FIG. 7 is a flowchart illustrating a display process of a wireless standard that the communication apparatuses having completed the connection support.

FIG. 7 is a flowchart illustrating the display process of the wireless standard that the communication apparatus 180 having completed the connection supports. The flowchart illustrated in FIG. 7 starts where the connection between the display device 110 and the communication apparatuses 180 has been completed in the flowchart illustrated in FIG. 6 (step S122).

Next, the display device 110 inquires the communication apparatus 180 having completed the connection about a wireless standard that the communication apparatus 180 supports (step S124). The display device 110 receives, as the response, information regarding the wireless standard that the communication apparatus 180 supports. Next, as illustrated in FIG. 2, the display device 110 lights or blinks a pointer supporting the wireless standard, at an end of the card 140 corresponding to the communication apparatus 180 that has received the response (step S126). At this moment, the display device 110 displays the pointer in a different color for each wireless standard.

(Communication Process of Communication Apparatuses 180 by Card on Display Device)

Next, a connection process of the communication apparatuses 180 by the card 140 disposed on the display device 110 will be described with reference to FIG. 8.

Figure 8:
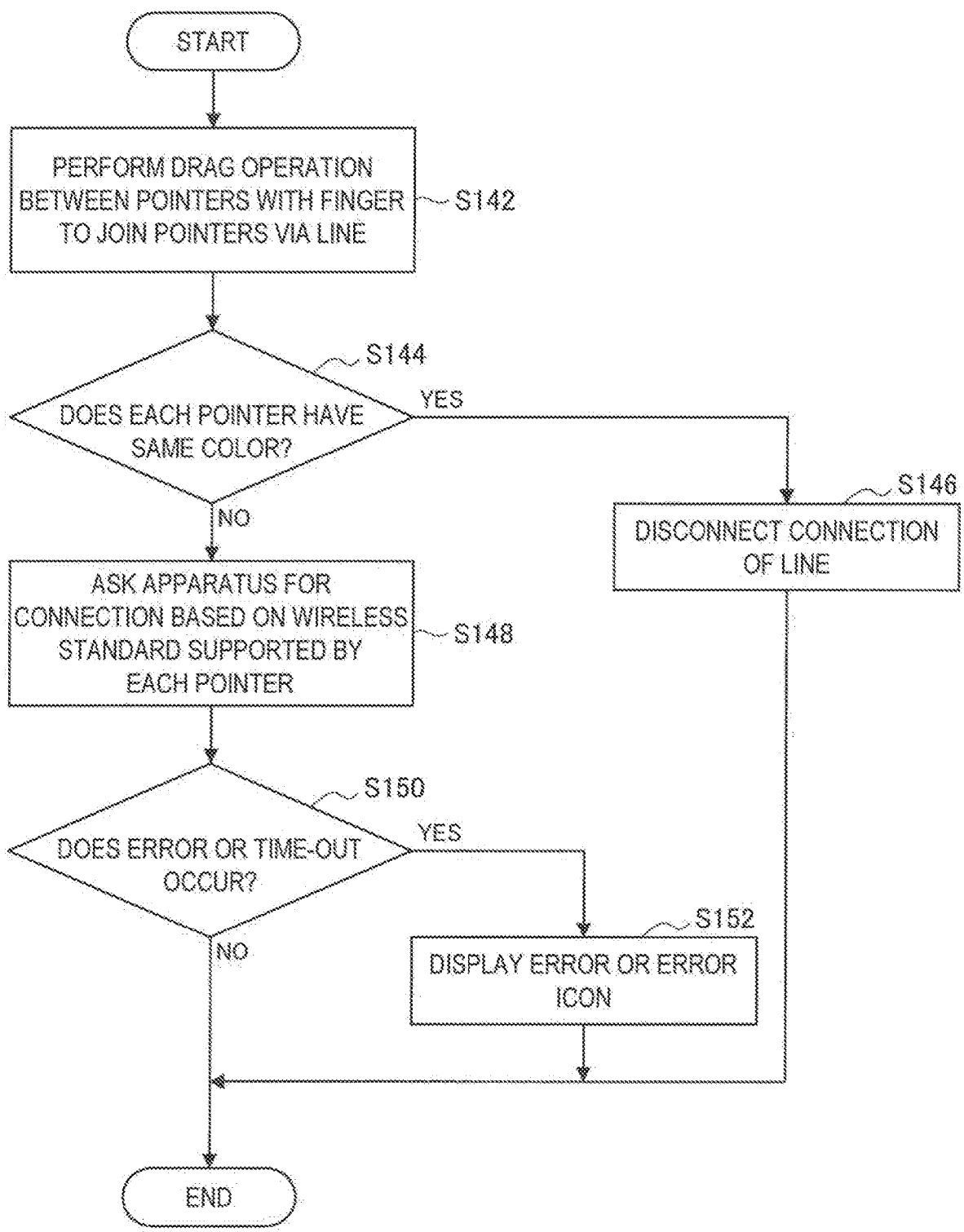
FIG. 8 is a flowchart illustrating a connection process of the communication apparatuses by a card disposed on the display device.

FIG. 8 is a flowchart illustrating the connection process of the communication apparatuses 180 by the card 140 disposed on the display device 110. The flowchart illustrated in FIG. 8 starts when a pointer supporting the wireless standard is lighted or blinked at the end of the card 140.

First, drag of a user's finger between pointers of the two cards 140 causes the display device 110 to join the two pointers using a line as illustrated in FIG. 3 (step S142). Next, the display device 110 determines whether the two pointers joined by the line have the same color (step S144). When it is determined in step S144 that the two pointers do not have the same color (No), it is meant that different wireless standards are joined. The display device 110 therefore disconnects the connection of the lines (step S146).

To the contrary, when it is determined in step S144 that the two pointers have the same color (Yes), the display device 110 requests the two communication apparatuses 180 corresponding to the two pointers to connect to each other based on the wireless standard supported by the pointers (step S148). The two communication apparatuses 180 hereby attempt to connect to each other based on the wireless standard supported by the pointers. When an error or time-out occurs while the connection is attempted between the two communication apparatuses 180 (step S150: Yes), the display device 110 displays an error or an error icon in order to notify a user (step S152).

(Display Process of Service Compatible with Communication Apparatuses)

Next, a display process of a service compatible with the communication apparatuses 180 connected by joining the pointers of the cards 140 will be described with reference to FIG. 9.

Figure 9:
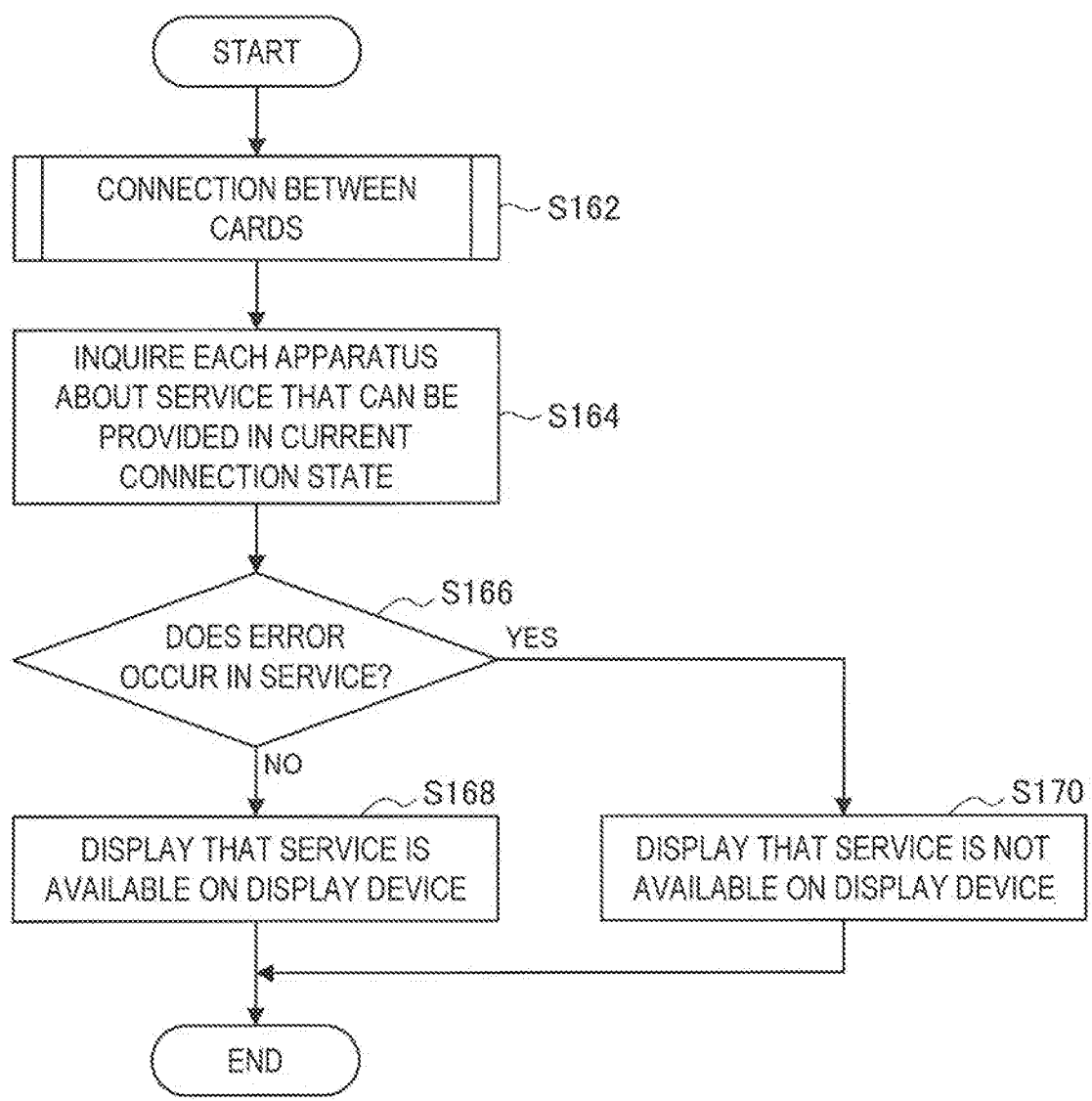
FIG. 9 is a flowchart illustrating a display process of a service compatible with the communication apparatus.

FIG. 9 is a flowchart illustrating the display process of the services compatible with the communication apparatuses 180. The flowchart illustrated in FIG. 9 starts when the communication apparatuses 180 are connected by joining the pointers of the cards 140 in the flowchart illustrated in FIG. 8 (step S162).

Next, the display device 110 inquires the communication apparatuses 180 about a service that the communication apparatuses 180 can provide in the current connection state of the communication apparatuses 180 (step S164). Next, the display device 110 determines whether an error occurs in the service (such as video distribution or file sharing) that the communication apparatuses 180 can provide (step S166). When it is determined in step S166 that an error does not occur (No), the display device 110 displays a notification that the service is available, as illustrated in FIG. 4 (step S168). To the contrary, when it is determined in step S166 that an error occurs (Yes), the display device 110 displays a notification that the service is not available (step S170).

2. Second Embodiment (2-1. Overview of Communication Control System)

In the above-described first embodiment, the communication apparatuses 180 are connected by disposing the cards 140 corresponding to the communication apparatuses 180 on the display device 110 and joining the cards 140. Meanwhile, in a second embodiment, blocks instead of the cards 140 are joined via cables so that communication apparatuses corresponding to the blocks are connected. An overview of a communication control system 200 according to the second embodiment of the present disclosure will be described below with reference to FIG. 10.

Figure 10:
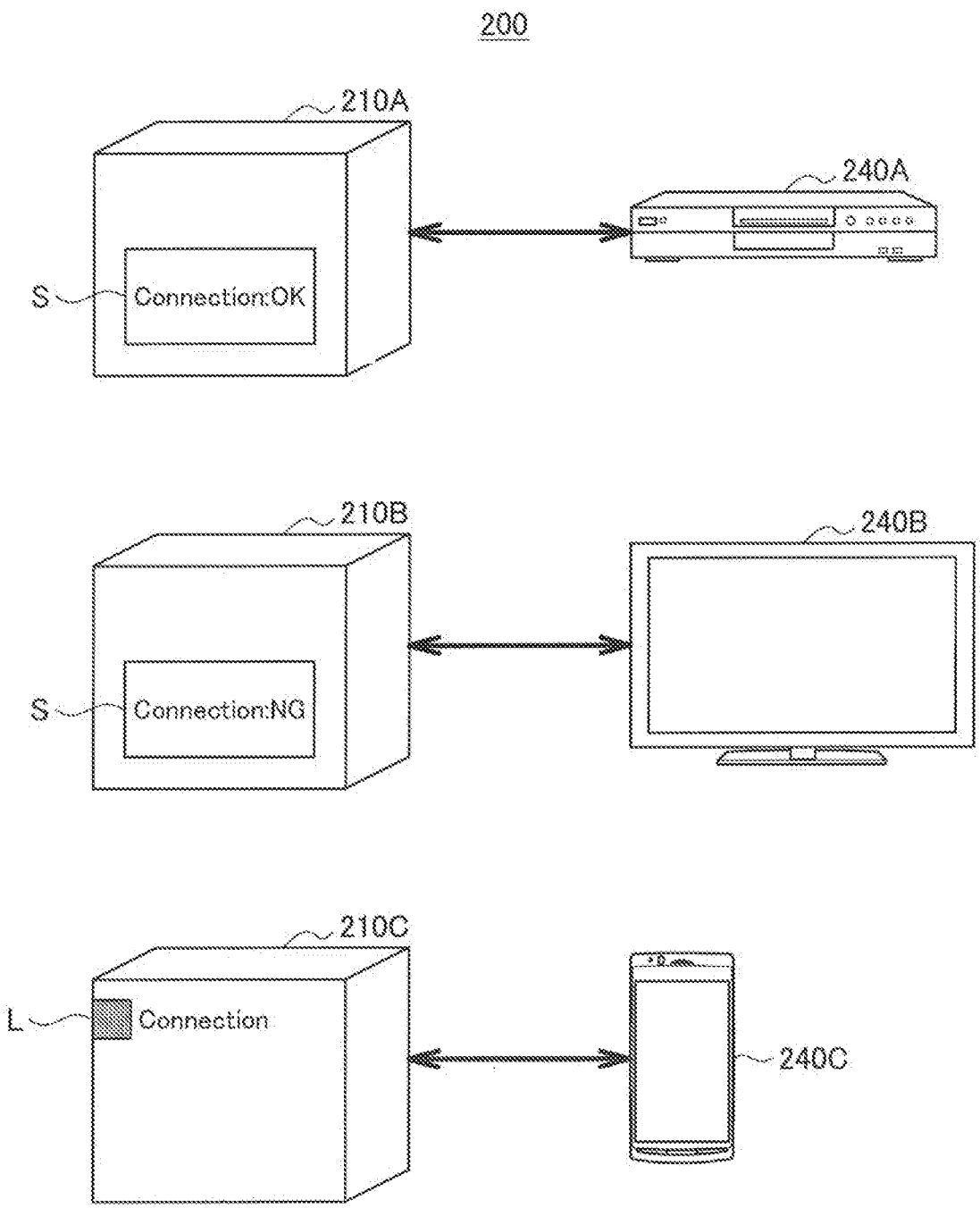
FIG. 10 is a diagram illustrating an example of a configuration of a communication control system according to a second embodiment.

FIG. 10 is a diagram illustrating an example of a configuration of the communication control system 200 according to the second embodiment. As illustrated in FIG. 10, the communication control system 200 includes blocks 210A, 210B, and 210C (which may be generically referred to as block 210, hereinafter), and communication apparatuses 240A, 210B, and 210C (which may be genetically referred to as communication apparatus 240, hereinafter). Although the three blocks 210A, 210B, and 210C, and the three communication apparatuses 240A, 240B, and 240C are shown in FIG. 10, the number of the blocks and the number of communication apparatuses are not limited thereto. Two, four, or more blocks and communication apparatuses may also be included.

Similarly to the communication apparatus 180 according to the first embodiment, the communication apparatus 240 is an apparatus that allows a user to use various services (functions) such as video distribution or video reception. The communication apparatus 240 performs wireless communication based on a wireless standard such as Bluetooth or Wi-Fi. The communication apparatuses 240A, 240B, and 240C illustrated in FIG. 10 can wirelessly communicate with each other.

The block 210A corresponds to the communication apparatus 240A, the block 210B corresponds to the communication apparatus 240B, and the block 210C corresponds to the communication apparatus 240C. For example, the block 210A may be an accessory for the communication apparatus 240A (the same applies for the other blocks 210B and 210C). As described below, the plurality of blocks 210A, 210B, and 210C can be connected to each other via cables or the like.

(Connection between Block 210 and Communication Apparatus 240)

The block 210 includes a function of wirelessly communicating with the corresponding communication apparatus 240. For example, the blocks 210A, 210B, and 210C illustrated in FIG. 10 can be paired with the corresponding communication apparatuses 240A, 240B, and 240C based on NFC or Bluetooth, and can complete one-to-one communication. Additionally, if the block 210 is an accessory for the communication 240, the block 210 and the communication apparatus 240 are available in the state in which they have been already paired with each other.

The block 210 can also inform a user of a connection state between the block 210 and the corresponding communication apparatus 240. For example, the block 210 can notify the user of completion or failure of the connection by using a display unit, a light emitting unit (such as an LED), or the like. The blocks 210A and 210B illustrated in FIG. 10 issue a notification on a display unit S, while the block 210C issues a notification by using a light emitting unit L. Additionally, although the blocks 210A and 210B use the display unit S to issue a notification in FIG. 10, they may use the light emitting unit to issue a notification.

(Notification of Wireless Standard That Communication Apparatus Supports)

The block 210 acquires, from the communication apparatus 240 having completed a connection, connection information regarding a wireless standard that the communication apparatus 240 supports. The block 210 notifies a user of the acquired information regarding the wireless standard.

Figure 11:
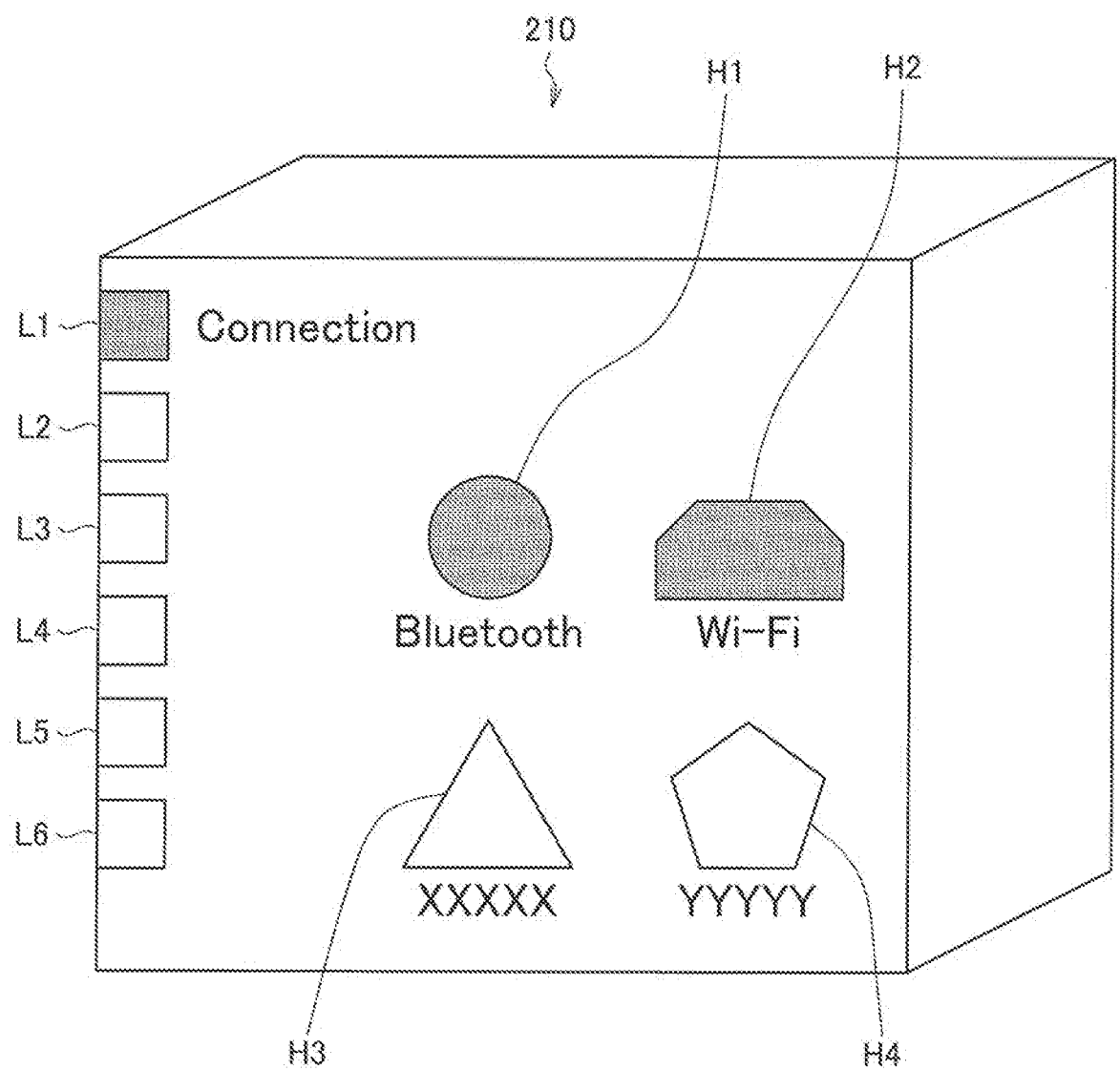
FIG. 11 is a diagram illustrating an example of a notification of wireless standards that communication apparatuses having completed a connection support.

FIG. 11 is a diagram illustrating an example of a notification regarding the wireless standard that the communication apparatus 240 having completed the connection supports. As illustrated in FIG. 11, the block 210 includes sockets H1 to H4 into which cables supporting wireless standards are inserted, and light emitting units L1 to L6 that are used for notifying a user. Additionally, the sockets H1 to H4 have different shapes and are assigned to the respective standards. The sockets H1 to H4 are configured to be lighted or blinked.

In FIG. 11, the block 210 has completed the connection to the corresponding communication apparatus 240, and the light emitting unit L1 used for showing that the connection is completed is lighted. In addition, since the communication apparatus 240 to which the block 210 corresponds supports the standards of Bluetooth and Wi-Fi, the sockets H1 and H2 that support the standards of Bluetooth and Wi-Fi are also lighted. Such a visual notification is issued, and a user can therefore easily grasp a wireless standard that the communication apparatus 240 supports.

Although the sockets H1 and H2 are configured to be lighted or blinked in FIG. 11, a way of notification is not limited thereto. A light emitting unit corresponding to the socket may be provided around the socket to emit light (see FIG. 12 described below). In FIG. 11, the sockets H1 to H4 are configured to have different shapes, but the shapes are not necessarily different. If a user can identify sockets that support to the respective wireless standards, the shapes of the sockets may be identical.

(Connection between Communication Apparatuses by Block)

In the second embodiment, once a user joins, via cables, the sockets H1 to H4 to which wireless standards of the two blocks 210 are assigned, to the communication apparatuses 240 corresponding to the two blocks 210 establish a connection based on the wireless standards supported by sockets. The user can hereby connect the communication apparatuses 240 based on the desired wireless standard without applying a complicated setting in the communication apparatuses 240.

Figure 12:
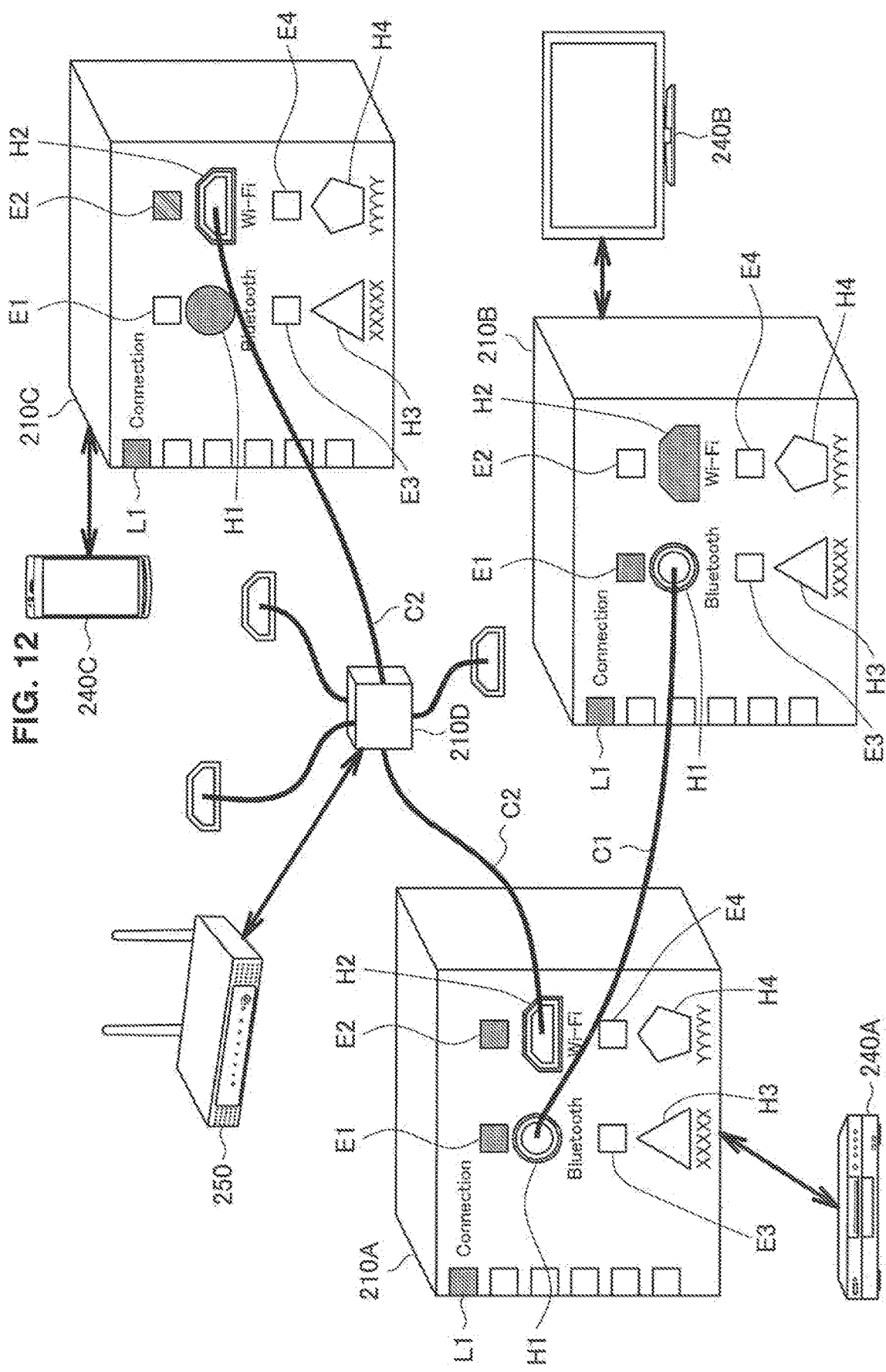
FIG. 12 is a diagram illustrating a state in which blocks are joined via cables.

FIG. 12 is a diagram illustrating a state in which the blocks 210 are joined via cables. In FIG. 12, the block 210A and the block 210B are joined via a cable C1 that supports Bluetooth, the block 210A and the block 210D are joined via a cable C2 that supports Wi-Fi, and the block 210C and the block 210D are joined via the cable C2 that supports Wi-Fi. Additionally, the block 210D is compatible with a Wi-Fi rooter 250 and establishes a one-to-one connection to the Wi-Fi rooter 250. In this way, the blocks are joined via the cables C1 and C2 so that the block 210A and the block 210B are connected based on Bluetooth, and the block 210D is connected to the block 210A and the block 210C based on Wi-Fi.

The block 210 includes connection notification units E1 to E4 around the corresponding sockets H1 to H4, and the connection notification units E1 to E4 are used for notifying a user whether the connection to another block is completed or the connection is failed after joined to a cable. For example, the connection notification units E1 to E4 are lighted and change the colors of the lights to issue notifications indicating that the connections are completed or failed. In FIG. 12, notifications are issued indicating that the blocks 210A and 210B have completed the connection and the block 210 has failed in the connection.

(Notification of Service compatible with Communication Apparatus)

The block 210 acquires, from the corresponding communication apparatus 240, service information regarding a service (such as video distribution, video reception, or file sharing) available to the communication apparatus 240, and issues a notification. A user can hereby visually grasp a service available to each communication apparatus 240.

Figure 13:
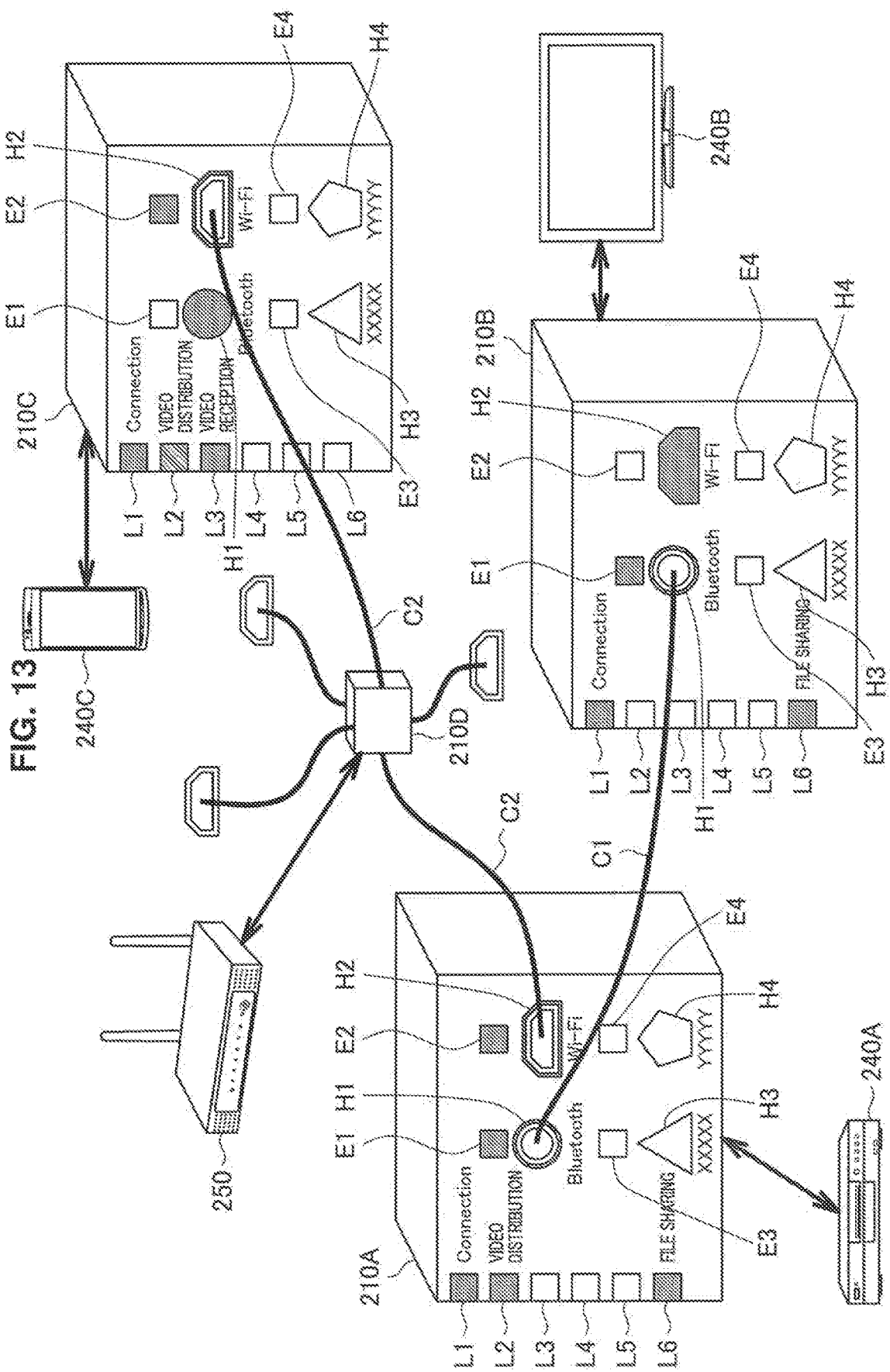
FIG. 13 is a diagram illustrating an example of a notification regarding a service available to each communication apparatus.

FIG. 13 is a diagram illustrating an example of a notification of services available to each communication apparatus 240. The blocks 210A, 210B, and 210C illustrated in FIG. 13 each include a plurality of light emitting units (light emitting units L2 to L6) for issuing notifications of service information. The light emitting units L2 to L6 change the colors of emitted light, for example, to issue notifications that services are available or are not available. In FIG. 13, the block 210A issues a notification that the communication apparatus 240A can use services for video distribution and file sharing, the block 210B issues a notification that the communication apparatus 240B can use the service for file sharing, and the block 210C issues a notification that the communication apparatus 240C is not capable of using video distribution due to an error, but can use video reception.

(2-2. Example of Functional Configuration of Communication Control Device)

In the first embodiment, the display device 110 includes the communication control device 150 (FIG. 5). Meanwhile, in the second embodiment, the block 210 includes the communication control device. An example of a functional configuration of a communication control device 250 according to the second embodiment will be described below with reference to FIG. 14.

Figure 14:
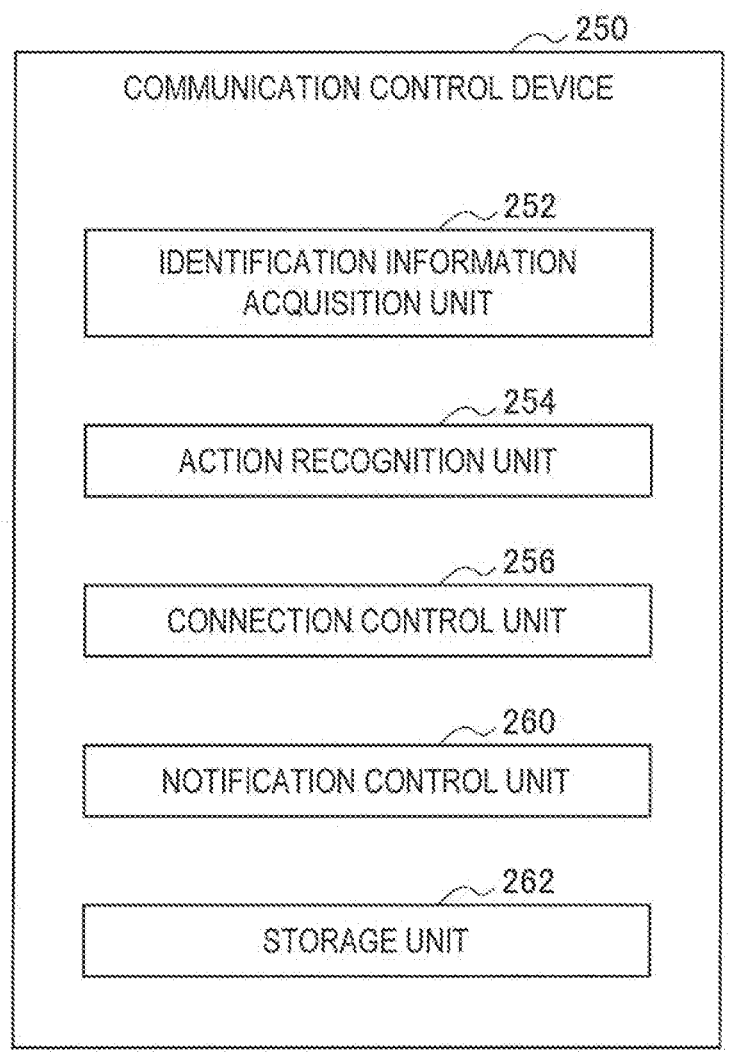
FIG. 14 is a block diagram illustrating an example of a functional configuration of a communication control device according to the second embodiment.

FIG. 14 is a block diagram illustrating the example of the functional configuration of the communication control device 250 according to the second embodiment. As illustrated in FIG. 14, similarly to the first embodiment, the communication control device 250 includes an identification information acquisition unit 252, an action recognition unit 254, a connection control unit 256, a notification control unit 260, and a storage unit 262.

The identification information acquisition unit 252 acquires identification information for identifying a communication apparatus of the block 210 stored in the storage unit 262. Let us assume below that a first object, which is a block-shaped object, is the block 210A, a second object is the block 210B, a first communication apparatus is the communication apparatus 240A, and a second communication apparatus is the communication apparatus 240B. The action recognition unit 254 recognizes an action of joining the two blocks 210A and 210B via a cable. That is, the action recognition unit 254 recognizes that cables are inserted into the sockets of the two blocks 210A and 210B.

The connection control unit 256 connects the communication apparatus 240A to the communication apparatus 240B through wireless communication based on the identification information of the two communication apparatuses 240A and 240B acquired for the communication apparatus 240A and the communication apparatus 240B respectively corresponding to the blocks 210A and 210B to which cables are joined. At this moment, the connection control unit 256 connects the communication apparatus 240A to the communication apparatus 240B based on wireless standards supported by the sockets having the cables inserted therein. A user can hereby intuitively understand which wireless standard is used for the connection.

As illustrated in FIG. 12, the notification control unit 260 issues a notification indicating the connection state of wireless communication between the connected communication apparatus 240A and communication apparatus 240B by using the display units or the light emitting units of the blocks 210A and 210B. As illustrated in FIG. 13, the notification control unit 260 also issues a notification indicating service information available to the communication apparatus 240A and the communication apparatus 240B by using the display units or the light emitting units of the blocks 210A and 210B.

(2-3. Example of Control Process of Wireless Communication)

An example of a control process of the wireless communication having the above-described configuration according to the second embodiment will be described below. The example of the process in the second embodiment is similar to the example of the process in the first embodiment, which has been described in FIGS. 6 to 9, and the process in the second embodiment is executed by the communication control device 250.

(Connection Process between Block and Communication Apparatus)

Figure 15:
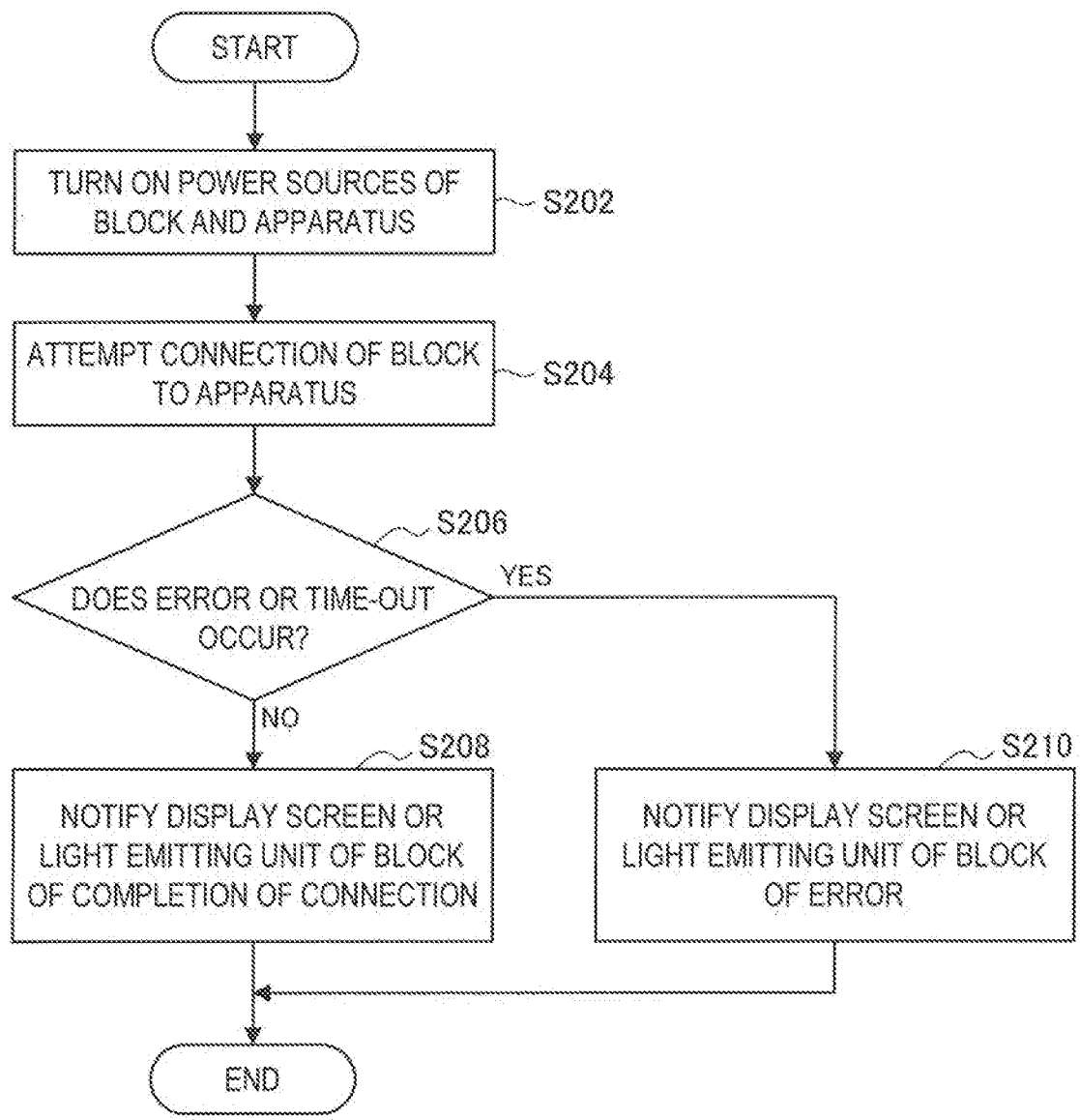
FIG. 15 is a flowchart illustrating a connection process between a block and the communication apparatuses.

FIG. 15 is a flowchart illustrating a connection process between the block 210 and the communication apparatus 240. The flowchart illustrated in FIG. 15 starts when the power sources of the block 210 and the communication apparatus 240 are turned on (step S202). Next, each block 210 attempts to connect to the corresponding communication apparatus 240 (step S204).

Next, if an error or time-out does not occur while connecting to the communication apparatus 240 (step S206: No), the block 210 uses the display screen or the light emitting unit to issue a notification indicating completion of the connection (step S208), as illustrated in FIG. 10. To the contrary, if an error or time-out occurs in step S206 (Yes), the block 210 uses the display screen or the light emitting unit to issue a notification of the error (step S210).

(Notification Process of Wireless Standard That Communication Apparatus Support)

Figure 16:
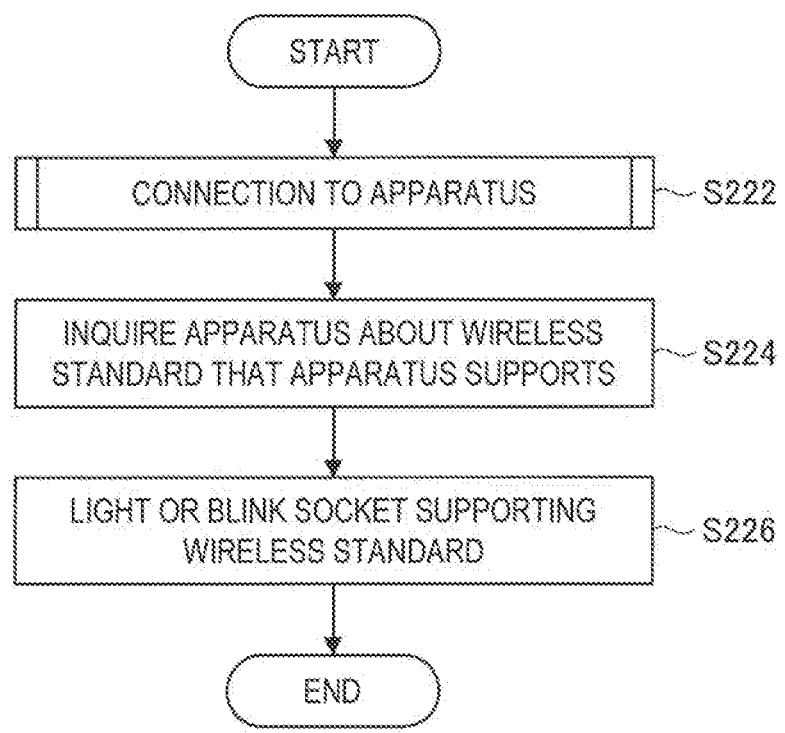
FIG. 16 is a flowchart illustrating a notification process of a wireless standard that the communication apparatuses having completed a connection supports.

FIG. 16 is a flowchart illustrating a notification process of a wireless standard that the communication apparatus 240 having completed the connection supports. The flowchart illustrated in FIG. 16 starts at the completion of the connection between the block 210 and the communication apparatus 240 (step S222) shown in the flowchart illustrated in FIG. 15.

Next, each block 210 inquires the communication apparatus 240 having completed the connection about a wireless standard that the communication apparatus 240 supports (step S224). Next, as illustrated in FIG. 11, each block 210 turns on or blinks a light at a socket supporting the wireless standard the communication apparatus 240 answers (step S226).

(Connection Process between Communication Apparatuses by Block)

Figure 17:
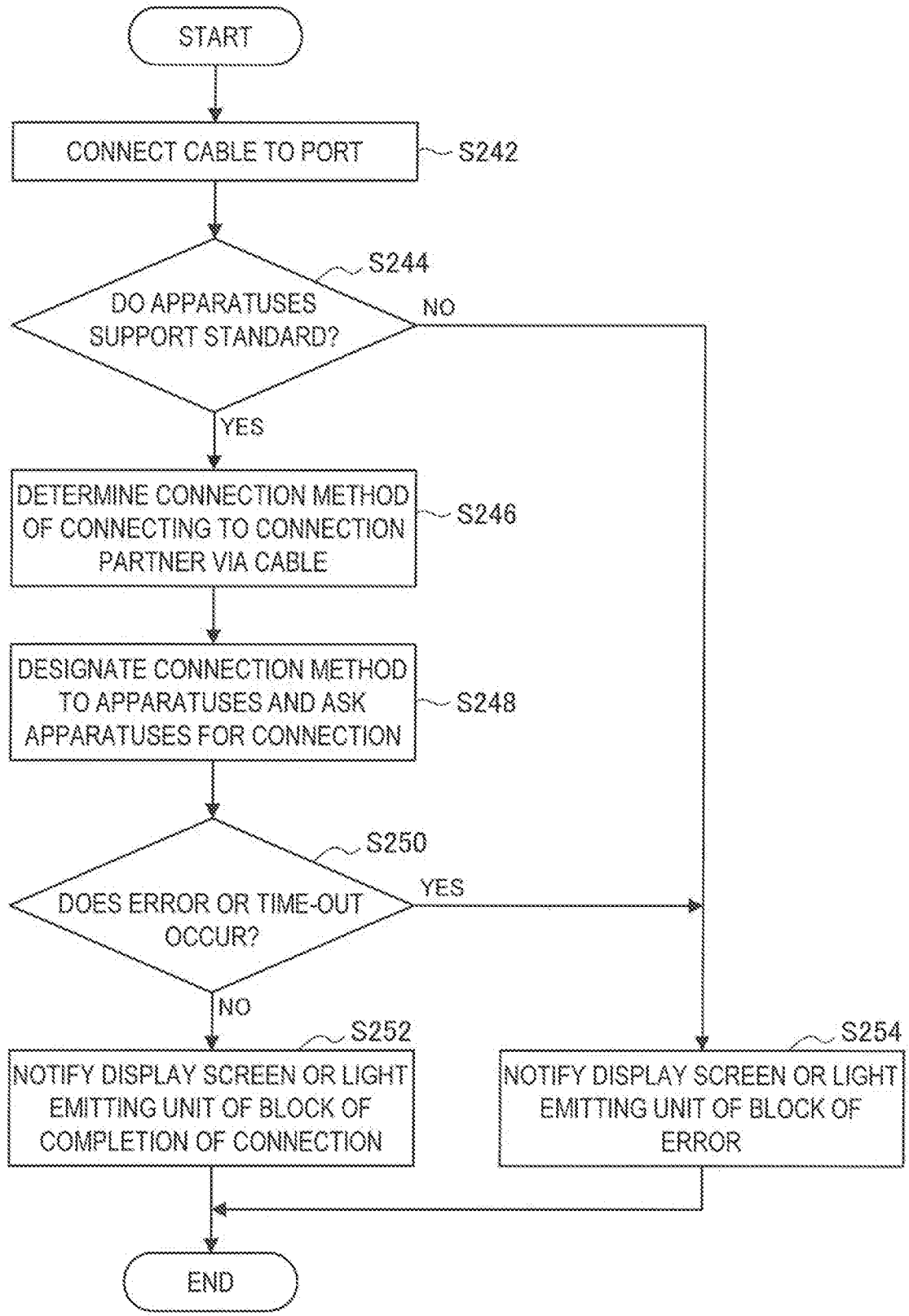
FIG. 17 is a flowchart illustrating a connection process of the communication apparatuses by the block.

FIG. 17 is a flowchart illustrating a connection process between the communication apparatuses 240 by the block 210. The flowchart illustrated in FIG. 17 starts when a user connects a cable into a port provided at the socket of the block 210 (step S242).

If the socket having the cable connected therein supports a wireless standard that the communication apparatuses 240 do not support (step S244: No), the block 210 displays an error (step S254). To the contrary, if the socket supports a wireless standard that the communication apparatuses 240 support in step S244 (Yes), the block 210 determines the wireless standard used for connecting the communication apparatuses 240 (step S246). Next, the block 210 asks the corresponding communication apparatuses 240 to connect to each other based on the determined wireless standard (step S248).

Thereafter, if an error or time-out does not occur when the two communication apparatuses 240 connect to each other based on the predetermined wireless standard (step S250: No), the block 210 uses the display screen or the light emitting unit to issue a notification of completion of the connection (step S252), as illustrated in FIG. 12. To the contrary, if an error or time-out occurs in step S250 (Yes), the block 210 uses the display screen or the light emitting unit to issue a notification of the error (step S254).

(Notification Process of Service Compatible with Communication Apparatuses)

Figure 18:
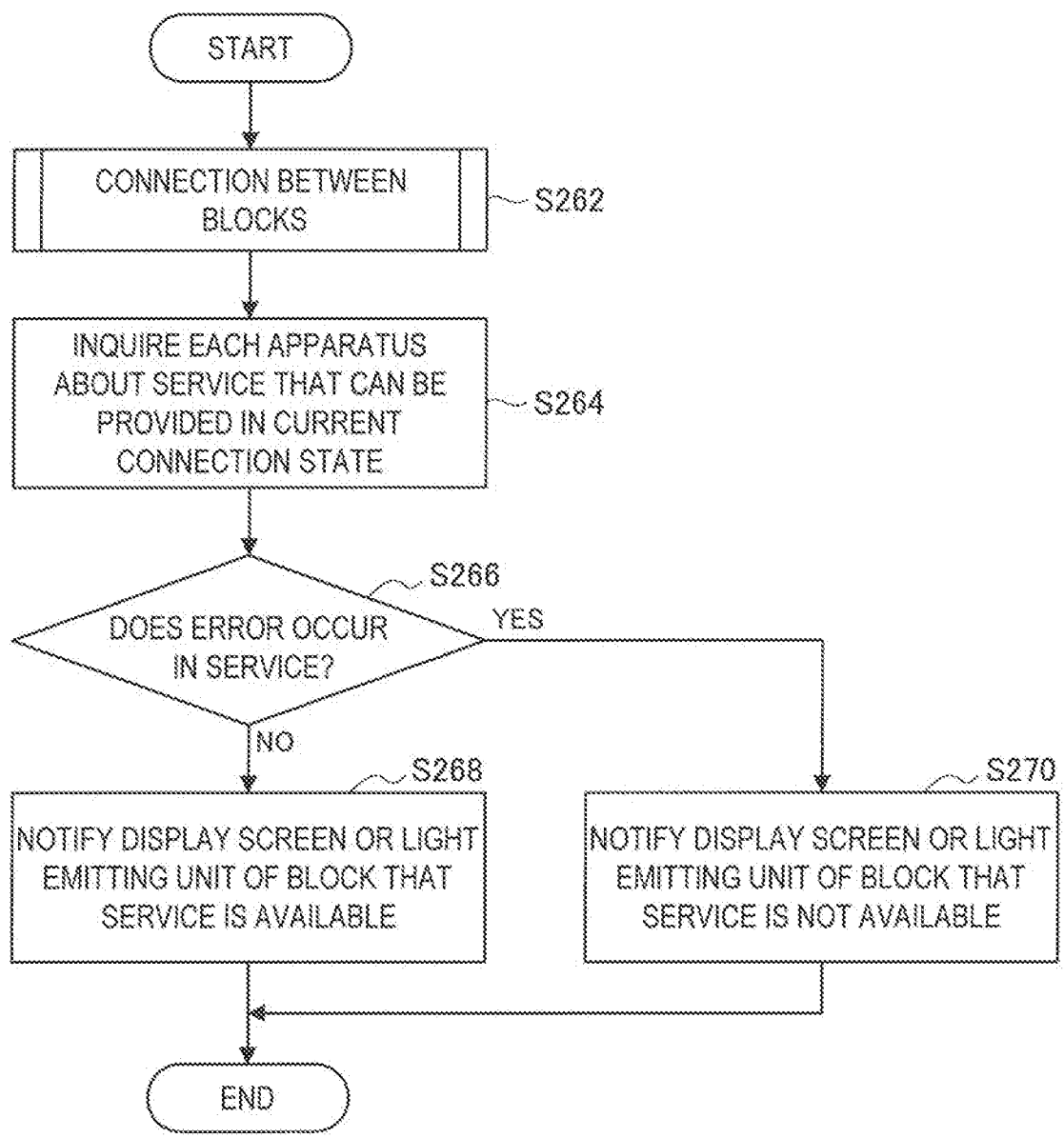
FIG. 18 is a flowchart illustrating a notification process of a service compatible with the communication apparatus.

FIG. 18 is a flowchart illustrating a notification process of services compatible with the communication apparatuses 240. The flowchart illustrated in FIG. 18 starts when the blocks 210 are joined via cables to connect the communication apparatuses 240 in the flowchart illustrated in FIG. 17 (step S262).

Next, each block 210 inquires the corresponding communication apparatus 240 about a service that the communication apparatus 240 can provide based on the current connection state of the communication apparatus 240 (step S264). If an error occurs in the service that the communication apparatus 240 can provide (step S266: Yes), the block 210 issues a notification that the service is not available (step S270), as illustrated in FIG. 13. To the contrary, if an error does not occur in the service in step S266 (No), the block 210 issues a notification that the service is available (step S268).

3. Other Embodiments

In the first embodiment, the communication apparatuses 180 corresponding to the cards 140 disposed on the display device 110 are connected. However, the configuration is not limited thereto, and configurations described below in FIGS. 19 and 20 may be adopted.

Third Embodiment

Figure 19:
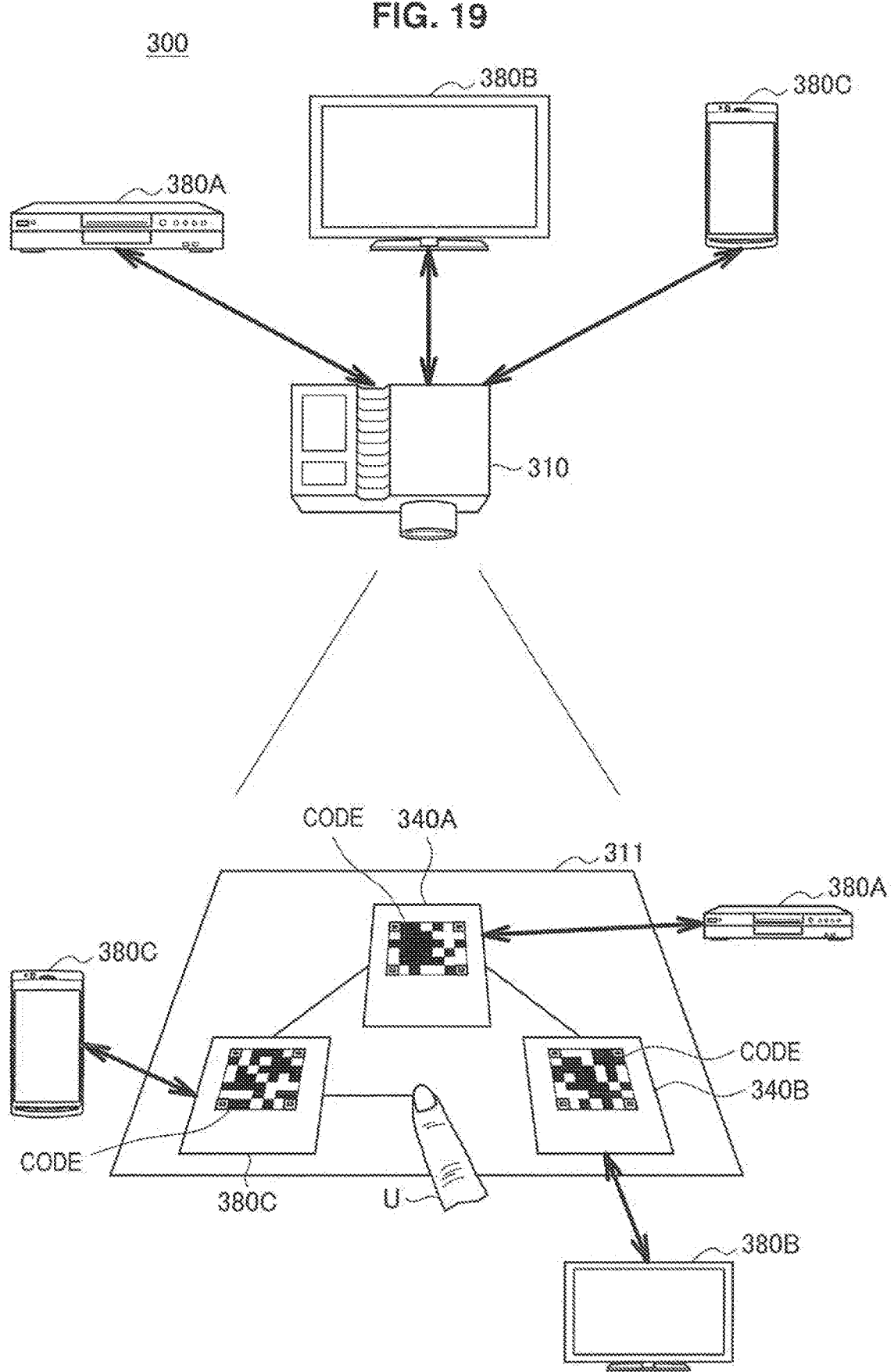
FIG. 19 is a diagram illustrating an example of a configuration of a communication control system according to a third embodiment.

FIG. 19 is a diagram illustrating an example of a configuration of a communication control system 300 according to a third embodiment. In the third embodiment, a projection device 310 such as a projector is used instead of the display device 110 in the first embodiment.

The projection device 310 projects a projection surface 311 on which cards 340A, 340B, and 340C (which may be generically referred to as card 340) corresponding to communication apparatuses 380A, 380B, and 380C (which may be generically referred to as communication apparatus 380), respectively, are disposed. The projection device 310 also includes a function of an imaging device for capturing a state of the card 340 disposed on the projection surface 311. Furthermore, the projection device 310 can wirelessly communicate with the communication apparatus 380 corresponding to the card 340 based on a code (such as a QR code) of the captured card 340. The code of the card 340 herein includes identification information for identifying the communication apparatus 380 to which the card 340 corresponds. For this reason, the projection device 310 can identify the communication apparatus 380 to which the card 340 corresponds by reading the code.

The projection device 310 can also recognize an action that a user U joins the cards 340 with the finger. For example, in FIG. 19, the projection device 310 recognizes actions between the card 340A and the card 340B, and between the card 340A and the card 340C. The projection device 310 establish a connection between, for example, the communication apparatus 380A and the communication apparatus 380B corresponding to the card 340A and the card 340B, respectively, based on the recognition result. Since a connection process between the communication apparatuses 380 by the projection device 310 is the same as the process performed by the display device 110 according to the first embodiment, the description is omitted here. In this way, in the third embodiment, the card 340 is used to allow a user to visually grasp a connection state of the communication apparatuses 380, and the communication apparatuses 380 to be easily connected.

Fourth Embodiment

Figure 20:
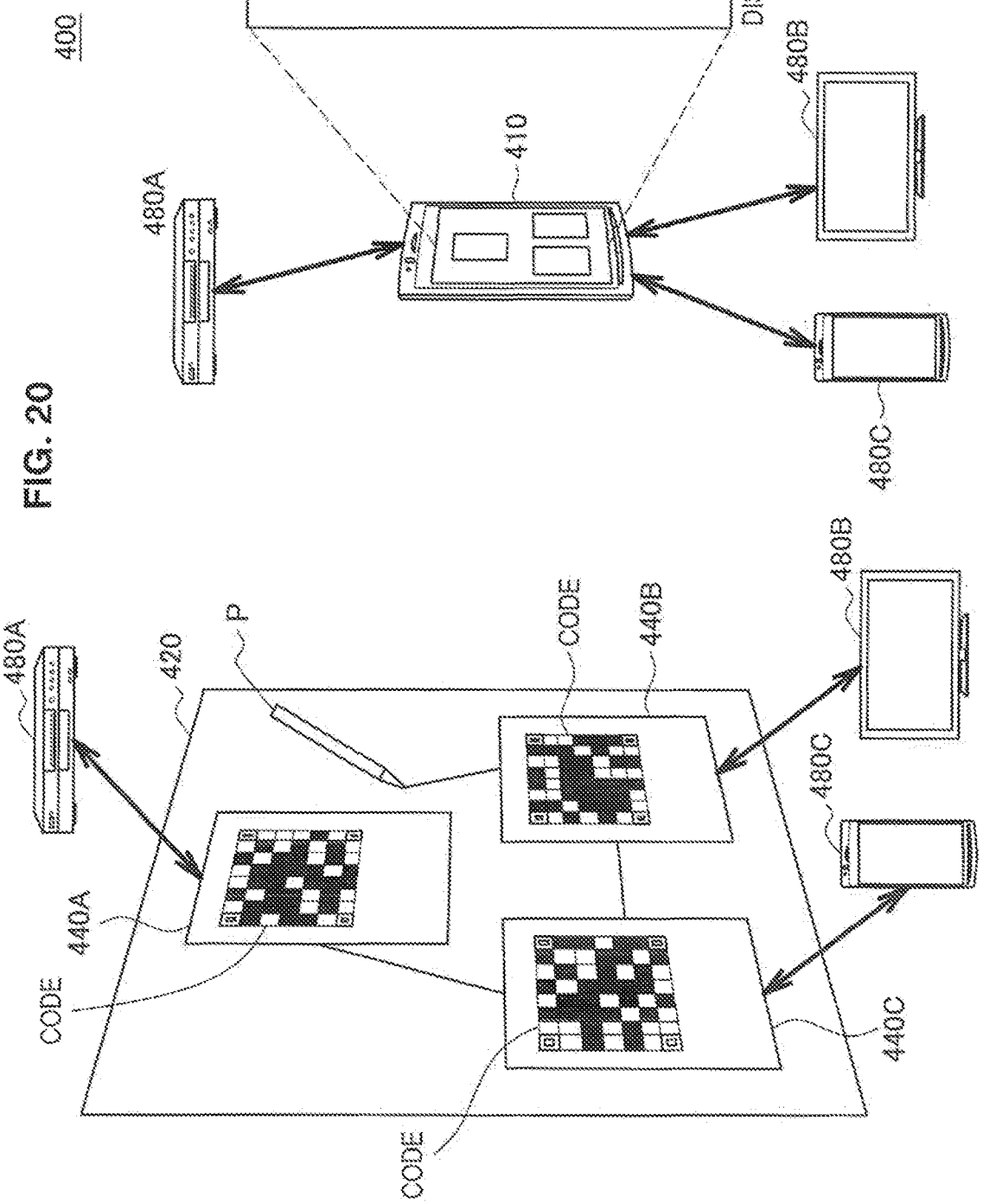
FIG. 20 is a diagram illustrating an example of a configuration of a communication control system according to a fourth embodiment.

FIG. 20 is a diagram illustrating an example of a configuration of a communication control system 400 according to a fourth embodiment. In the fourth embodiment, a mobile terminal 410 such as a smartphone is used instead of the display device 110 in the first embodiment.

In the fourth embodiment, cards 440A, 440B, and 440C (which may be generically referred to as card 440) corresponding to communication apparatus 480A, 480B, and 480C (which may be generically referred to as communication apparatus 480), respectively, also include codes (such as QR codes). The card 440 is disposed on paper 420 in the fourth embodiment.

The mobile terminal 410 includes a function of capturing a still image or the like, and captures the card 440 disposed on the paper 420. The mobile terminal 410 analyzes the code in the captured image (that is, identifies the communication apparatuses 480 corresponding the cards 440), and can wirelessly communicate with the communication apparatus 480 corresponding to the card 440. In the fourth embodiment, a user U draws a line on paper 420 using a pen P to join the cards 440. For example, in FIG. 20, the card 440A is joined to the card 440C, and a connection is established between the communication apparatus 480A and the communication apparatus 480C corresponding to the card 440A and the card 440C, respectively. In this way, in the fourth embodiment, a user can also use the card 440 to visually grasp a connection state of the communication apparatuses 480, and the communication apparatuses 480 can be easily connected.

4. Conclusion

As described above, in the present disclosure, an action for coupling objects such as cards and blocks that a user can visually watch and that correspond to communication apparatuses which perform wireless communication is recognized, and the two communication apparatuses corresponding to the coupled objects are connected through wireless communication. The user can hereby visually grasp the wireless communication invisible for the user's eyes so that the user can connect the apparatuses more easily through the wireless communication and can grasp the connection state of the wireless communication more easily.

It should be understood by those skilled in the art that various modifications, combinations, sub-combinations and alterations may occur depending on design requirements and other factors insofar as they are within the scope of the appended claims or the equivalents thereof.

The steps illustrated in the flowcharts in the above-described embodiment naturally include processes performed in the described and chronological order, and further include processes that are not necessarily performed in chronological order, but are also performed in parallel or are individually performed. It is also possible to change the order as necessary even in the steps for chronologically performing the processes.

A process performed by the information processing apparatus described in the present specification may be realized by using any one of software, hardware, and a combination of software and hardware. A program included in software is stored in advance in, for example, a storage medium that is built in or externally provided to each apparatus. When executed, programs are each read out by, for example, Random Access Memory (RAM), and executed by a processor such as a CPU.

Additionally, the present technology may also be configured as below.

(1) A communication control device for controlling wireless communication among a plurality of communication apparatuses, the communication control device including:
an identification information acquisition unit configured to acquire, from a first object corresponding to a first communication apparatus of the plurality of communication apparatuses, first identification information for identifying the first communication apparatus, and to acquire, from a second object corresponding to a second communication apparatus of the plurality of communication apparatuses, second identification information for identifying the second communication apparatus;
an action recognition unit configured to recognize an action of coupling the first object with the second object; and
a connection control unit configured to perform communication between the first communication apparatus and the second communication apparatus corresponding to the coupled first object and second object, respectively, based on the acquired first identification information and second identification information to connect the first communication apparatus to the second communication apparatus through wireless communication.

(2) The communication control device according to (1), wherein the first object and the second object are each a card-shaped object.

(3) The communication control device according to (2), wherein the first object and the second object are disposed on a display device on which a touch operation is capable of being performed, and
wherein the action of coupling the first object with the second object is an action of joining the first object to the second object by performing the touch operation on the display device.

(4) The communication control device according to (3), further including:
a display control unit configured to display, on the display device, information regarding a wireless standard that each of the first communication apparatus and the second communication apparatus supports.

(5) The communication control device according to (4), wherein the display control device displays pointers supporting a plurality of the wireless standards, respectively, in association with the first object and the second object, and
wherein, once the action recognition unit recognizes the action of performing the touch operation to join the pointers associated with the first object and the second object, the connection control unit connects the first communication apparatus to the second communication apparatus based on the plurality of wireless standards supported by the pointers.

(6) The communication control device according to (1), wherein the first object and the second object are each a block-shaped object.

(7) The communication control device according to (6), wherein the action of coupling the first object with the second object is an action of joining the first object to the second object via a cable.

(8) The communication control device according to (7), wherein the first object and the second object each include a plurality of sockets that support a plurality of wireless standards, and
wherein the connection control unit connects the first communication apparatus to the second communication apparatus based on wireless standards supported by sockets into each of which the cable is inserted.

(9) The communication control device according to any one of (1) to (8), further including:
a notification control unit configured to use a display unit or a light emitting unit to issue a notification indicating whether a connection between the first communication apparatus and the second communication apparatus through the wireless communication has been completed.

(10) The communication control device according to any one of (1) to (9), further including:
a notification control unit configured to use a display unit or a light emitting unit to issue a notification of service information available to the first communication apparatus and the second communication apparatus.

(11) A communication control method including:
acquiring, from a first object corresponding to a first communication apparatus of a plurality of communication apparatuses capable of wirelessly communicating with each other, first identification information for identifying the first communication apparatus, and acquiring, from a second object corresponding to a second communication apparatus, second identification information for identifying the second communication apparatus;
recognizing an action of coupling the first object with the second object; and
performing communication between the first communication apparatus and the second communication apparatus corresponding to the coupled first object and second object, respectively, based on the acquired first identification information and second identification information to connect the first communication apparatus to the second communication apparatus through wireless communication.

(12) A program for causing a computer to execute:
acquiring, from a first object corresponding to a first communication apparatus of a plurality of communication apparatuses capable of wirelessly communicating with each other, first identification information for identifying the first communication apparatus, and acquiring, from a second object corresponding to a second communication apparatus, second identification information for identifying the second communication apparatus;
recognizing an action of coupling the first object with the second object; and performing communication between the first communication apparatus and the second communication apparatus corresponding to the coupled first object and second object, respectively, based on the acquired first identification information and second identification information to connect the first communication apparatus to the second communication apparatus through wireless communication.

(13) A communication control system including:
a plurality of communication apparatuses capable of wirelessly communicating with each other;
a plurality of objects corresponding to the plurality of communication apparatuses, respectively, the plurality of objects each including identification information for a corresponding communication apparatus; and
a communication control device configured to control a connection through wireless communication among the plurality of communication apparatuses,
wherein the communication control device includes
an identification information acquisition unit configured to acquire, from a first object corresponding to a first communication apparatus of the plurality of communication apparatuses, first identification information for identifying the first communication apparatus, and to acquire, from a second object corresponding to the second communication apparatus of the plurality of communication apparatuses, second identification information for identifying the second communication apparatus,
an action recognition unit configured to recognize an action of coupling the first object with the second object, and
a connection control unit configured to perform communication between the first communication apparatus and the second communication apparatus corresponding to the coupled first object and second object, respectively, based on the acquired first identification information and second identification information to connect the first communication apparatus to the second communication apparatus through wireless communication.

What is claimed is:

1. An information processing apparatus comprising:
circuitry configured to
capture a first identification information corresponding to a first apparatus,
capture a second identification information corresponding to a second apparatus,
control a projection device to project, on a projection surface:
a first icon corresponding to the first apparatus and a second icon corresponding to the second apparatus; and
a first connection part and a second connection part, at outer boundaries of the first icon and the second icon respectively, to be connected with a first line based on an establishing of a wireless connection between the first apparatus and the second apparatus,
acquire information obtained based on an action of coupling the first apparatus and the second apparatus, and
control the establishing of the wireless connection between the first apparatus and the second apparatus based on the captured first and second identification information and the acquired information.

2. The information processing apparatus according to claim 1, wherein the circuitry is further configured to obtain user input information based on an input made upon the projection surface corresponding to the action of coupling the first apparatus and the second apparatus.

3. The information processing apparatus according to claim 1, wherein
the circuitry is further configured to obtain user input information based on an input drawn between the first apparatus and the second apparatus, which corresponds to the action of coupling the first apparatus and the second apparatus.

4. The information processing apparatus according to claim 1, wherein
the circuitry is further configured to control the projection device to project a message to indicate whether the establishing of the wireless connection has been completed or not.

5. The information processing apparatus according to claim 1, wherein the first apparatus and the second apparatus are block-shaped objects.

6. The information processing apparatus according to claim 1, wherein
the circuitry is further configured to control the projection device to project a third connection part at the first icon, the first connection part and the third connection part corresponding to wireless connections different from each other.

7. The information processing apparatus according to claim 6, wherein
the first connection part and the third connection part correspond to wireless standards different from each other.

8. The information processing apparatus according to claim 1, wherein
the projection device is configured to recognize a gesture action, and
the action of coupling the first apparatus and the second apparatus is a successive gesture action to the first connection part and the second connection part.

9. The information processing apparatus according to claim 8, wherein
the successive gesture action to the first connection part and the second connection part is a drag action.

10. An information processing method comprising:
capturing a first identification information corresponding to a first apparatus;
capturing a second identification information corresponding to a second apparatus;
controlling a projection device to project, on a projection surface, a first icon corresponding to the first apparatus and a second icon corresponding to the second apparatus;
controlling the projection device to project, on the projection surface, a first connection part and a second connection part at outer boundaries of the first icon and the second icon respectively, to be connected with a first line based on an establishing of a wireless connection between the first apparatus and the second apparatus; and
acquiring information obtained based on an action of coupling the first apparatus and the second apparatus,
wherein the wireless connection between the first apparatus and the second apparatus is established based on the captured first and second identification information and the acquired information.

11. The information processing method according to claim 10, further comprising:
obtaining user input information based on an input made upon the projection surface corresponding to the action of coupling the first apparatus and the second apparatus.

12. The information processing method according to claim 10, further comprising:
obtaining user input information based on an input drawn between the first apparatus and the second apparatus, which corresponds to the action of coupling the first apparatus and the second apparatus.

13. The information processing method according to claim 10, further comprising:
projecting, on the projection surface, a message to indicate whether the establishing of the wireless connection has been completed or not.

14. The information processing method according to claim 10, wherein the first apparatus and the second apparatus are block-shaped objects.

15. The information processing method according to claim 10, further comprising:
projecting, on the projection surface, a third connection part at the first icon, the first connection part and the third connection part corresponding to wireless connections different from each other.

16. The information processing method according to claim 15, wherein
the first connection part and the third connection part correspond to wireless standards different from each other.

17. The information processing method according to claim 10, further comprising:
recognizing a gesture action,
wherein the action of coupling the first apparatus and the second apparatus is a successive gesture action to the first connection part and the second connection part.

18. The information processing method according to claim 17, wherein the successive gesture action to the first connection part and the second connection part is a drag action.

19. A non-transitory computer-readable medium having embodied thereon a program, which when executed by a computer causes the computer to execute a method, the method comprising:
capturing a first identification information corresponding to a first apparatus;
capturing a second identification information corresponding to a second apparatus;
controlling a projection device to project, on a projection surface, a first icon corresponding to the first apparatus and a second icon corresponding to the second apparatus;
controlling the projection device to project, on the projection surface, a first connection part and a second connection part at outer boundaries of the first icon and the second icon respectively, to be connected with a first line based on an establishing of a wireless connection between the first apparatus and the second apparatus; and
acquiring information obtained based on an action of coupling the first apparatus and the second apparatus,
wherein the wireless connection between the first apparatus and the second apparatus is established based on the captured first and second identification information and the acquired information.

20. The information processing apparatus according to claim 1, wherein
the circuitry controls the projection device to project, on the projection surface, the first connection part and the second connection part to be adjacent to respective outer boundaries of the first icon and the second icon, and then controls the projection device to project, on the projection surface, the first connection part and the second connection part to be connected with the first line based on the establishing of the wireless connection between the first apparatus and the second apparatus.

* * * * *